United States Patent
Chawla et al.

(10) Patent No.: US 11,500,754 B2
(45) Date of Patent: Nov. 15, 2022

(54) GRAPH-BASED DATA MULTI-OPERATION SYSTEM

(71) Applicant: Dell Products L.P., Round Rock, TX (US)

(72) Inventors: Gaurav Chawla, Austin, TX (US); Mark Steven Sanders, Roanoke, VA (US); William Price Dawkins, Lakeway, TX (US); Jimmy D. Pike, Georgetown, TX (US); Elie Jreij, Pflugerville, TX (US); Robert W. Hormuth, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 17/076,076

(22) Filed: Oct. 21, 2020

(65) Prior Publication Data
US 2022/0121546 A1 Apr. 21, 2022

(51) Int. Cl.
*G06F 11/34* (2006.01)
*G06F 11/32* (2006.01)
*G06F 11/30* (2006.01)

(52) U.S. Cl.
CPC ........ *G06F 11/3409* (2013.01); *G06F 11/302* (2013.01); *G06F 11/323* (2013.01); *G06F 11/3404* (2013.01)

(58) Field of Classification Search
CPC ...... G06F 11/08; G06F 11/302; G06F 11/323; G06F 11/3404; G06F 11/3409
USPC ......................................................... 702/182
See application file for complete search history.

(56) References Cited

U.S. PATENT DOCUMENTS

| | | | |
|---|---|---|---|
| 7,451,297 B2 | 11/2008 | Bittner, Jr. | |
| 10,469,397 B2 | 11/2019 | Fleming et al. | |
| 2014/0365748 A1* | 12/2014 | Ivanov | G06F 9/30003 712/220 |
| 2020/0301898 A1* | 9/2020 | Samynathan | G06F 16/2453 |

* cited by examiner

Primary Examiner — John H Le
(74) Attorney, Agent, or Firm — Joseph Mencher

(57) ABSTRACT

A graph-based data multi-operation system includes a data multi-operation management subsystem coupled to an application and accelerator subsystems. The data multi-operation management subsystem receives a data multi-operation graph from the application that identifies first data and defines operations for performance on the first data to transform the first data into second data. The data multi-operation management subsystem assigns each of the operations to at least one of the accelerator systems, and configures the accelerator subsystems to perform the operations in a sequence that transforms the first data into the second data, When the data multi-operation management subsystem determine a completion status for the performance of the operations by the accelerator subsystems, it transmits a completion status communication to the application that indicates the completion status of the performance of the plurality of operations by the plurality of accelerator subsystems.

20 Claims, 22 Drawing Sheets

GRAPH-BASED DATA MULTI-OPERATION SYSTEM

BACKGROUND

The present disclosure relates generally to information handling systems, and more particularly to performing multiple operations on data in information handling systems using data multi-operation graphs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may include applications that require the performance of operations on data accessible to their server device. For example, storage applications (e.g., Software Defined Storage (SDS) applications in a server device) may require multiple operations to be performed on first data that is stored at a source location to provide second data that is stored at a destination location. Conventional storage applications have traditionally performed each of those multiple operations in software, but the implementation of faster storage devices (e.g., Non-Volatile Memory express (NVMe) storage devices), faster networks, and/or other technology has begun to create a bottleneck at the storage application performing such software-based operations. Conventional solutions to such issues has been to move from the purely software-defined paradigm discussed above to a hardware-accelerated software-defined paradigm that provides hardware accelerator devices that offload the performance of such operations from the storage applications. For example, SmartNIC devices have been introduced that allow the storage applications request the use of hardware accelerator devices included on and/or accessible to the SmartNIC device for performing the multiple operations on data discussed above.

However, in conventional hardware-accelerated software-defined systems, each hardware accelerator device includes a separate interface (e.g., via an Software Development Kit (SDK)) that must be invoked by the storage application each time the operation performed by that hardware accelerator device must be performed on data. As such, when multiple operations (e.g., compression operations, encryption operations, checksum operations, hash operations, data movement operations, RAID operations, XOR operations, erasure coding operations, text search operations, machine learning inference operations, etc.) must be performed on data, the storage application must make a separate operation performance call to the SmartNIC device to utilize each hardware accelerator device (e.g., a first call to utilize a compression operation hardware accelerator device, a second call to utilize an encryption operation hardware accelerator device, a third call to utilize a checksum operation hardware accelerator device, a fourth call to utilize a hash operation hardware accelerator device, a fifth call to utilize a data movement operation hardware accelerator device, a sixth call to utilize a RAID operation hardware accelerator device, a seventh call to utilize an XOR operation hardware accelerator device, an eighth call to utilize an erasure coding operation hardware accelerator device, a ninth call to utilize a text search hardware accelerator device, a tenth call to utilize a machine learning inference operation hardware accelerator device, etc.), and the SmartNIC device must subsequent perform an interrupt to the storage application to report the completion of the respective operation performance by each of those hardware accelerator devices. As will be appreciated by one of skill in the art in possession of the present disclosure, the separate interactions between the storage application, SmartNIC device, and hardware accelerator devices requires hardware accelerator device vendor-specific and custom hardware integrations that increase costs and can have negative effects on the performance of the storage applications.

Accordingly, it would be desirable to provide a data multi-operation system that addresses the issues discussed above.

SUMMARY

According to one embodiment, an Information Handling System (IHS) includes a processing subsystem; and a memory subsystem that is coupled to the processing subsystem and that includes instructions that, when executed by the processing subsystem, cause the processing subsystem to provide a data multi-operation management engine that is configured to: receive, from an application, a data multi-operation graph that identifies first data and defines a plurality of operations for performance on the first data to transform the first data into second data; assign each of the plurality of operations defined by the data multi-operation graph to at least one of a plurality of accelerator systems coupled to the processing system; configure the plurality of accelerator subsystems to perform the plurality of operations defined by the data multi-operation graph in a sequence that transforms the first data into the second data; determine a completion status for the performance of the plurality of operations by the plurality of accelerator subsystems to transform the first data into the second data; and transmit, to the application, a completion status communication that indicates the completion status of the performance of the plurality of operations by the plurality of accelerator subsystems to transform the first data into the second data.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
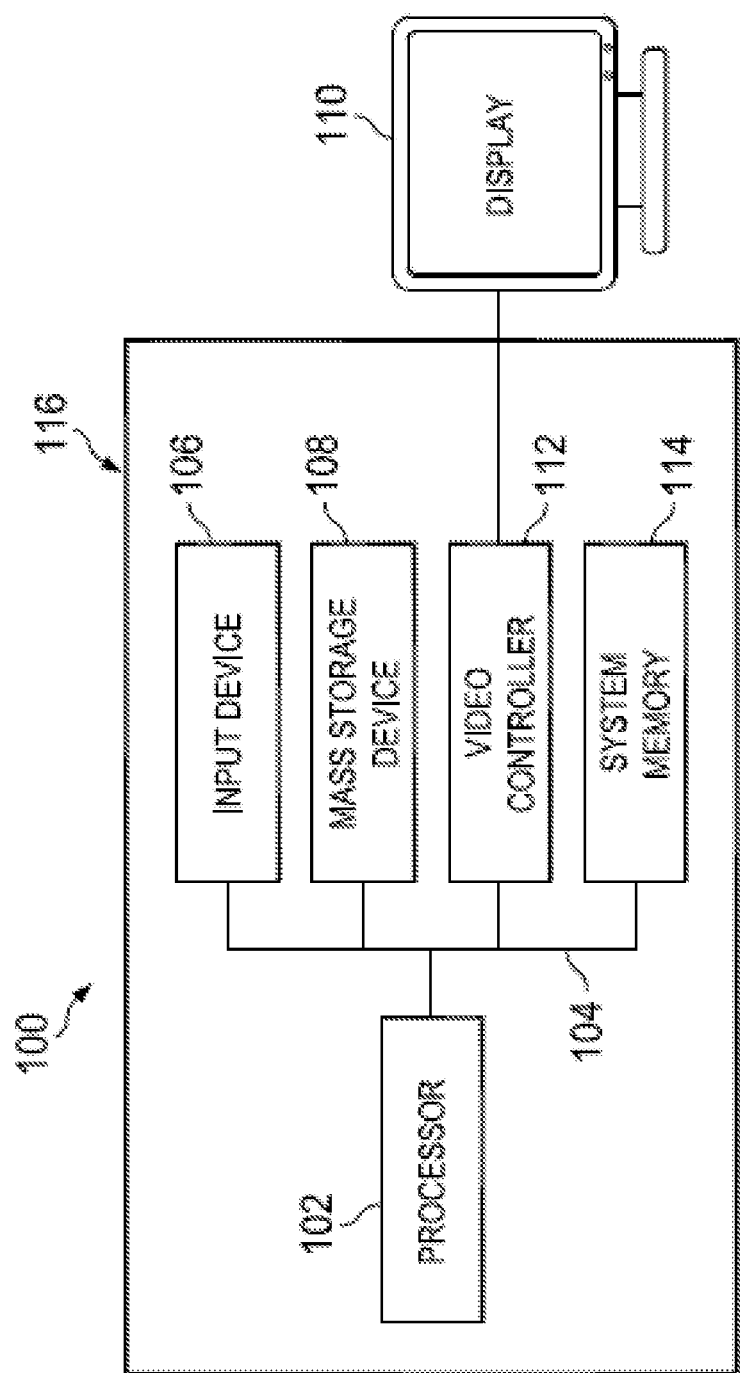
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
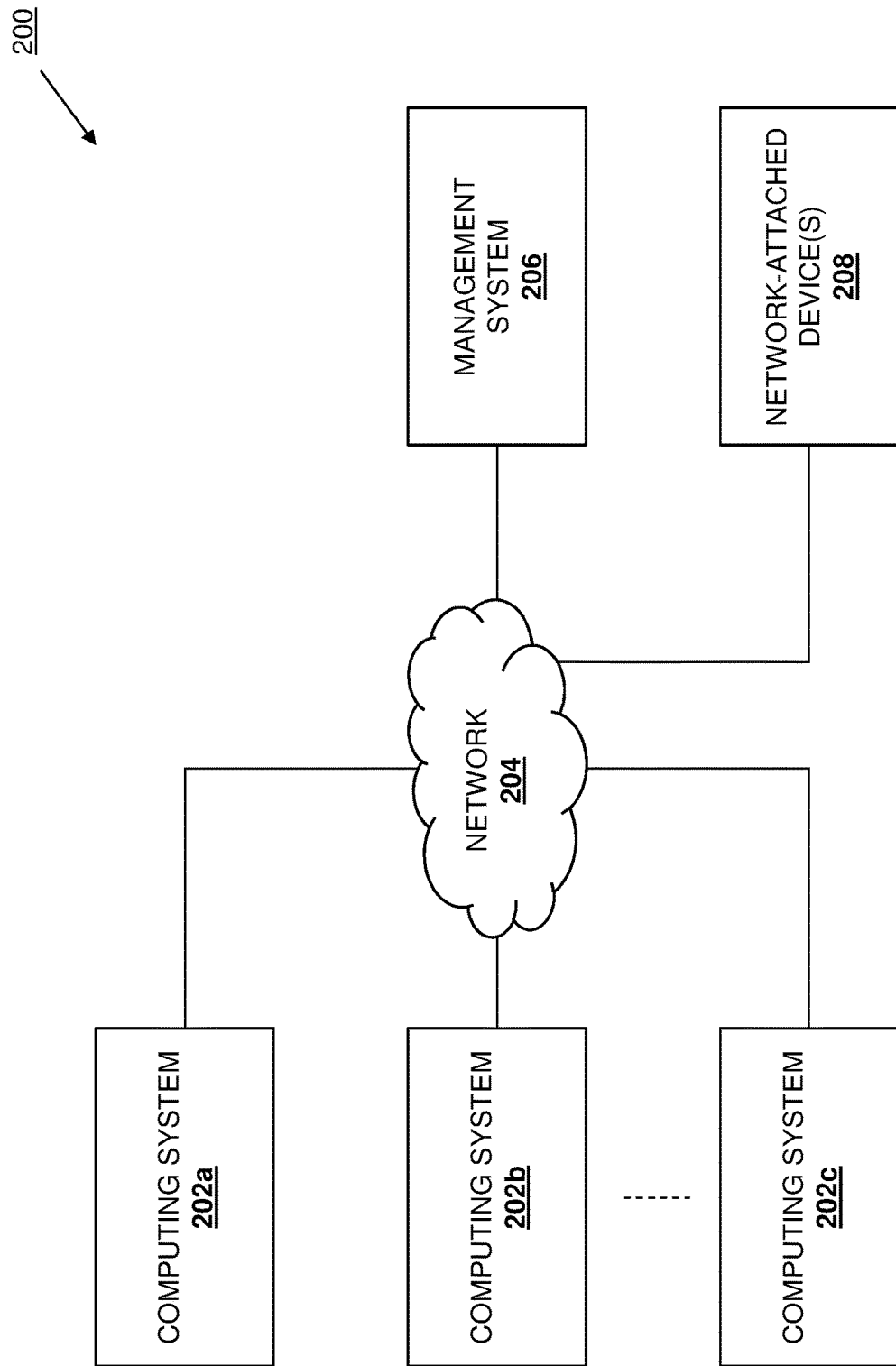
FIG. 2 is a schematic view illustrating an embodiment of a networked system.

Referring now to FIG. 2, an embodiment of a networked system 200 is illustrated in which the graph-based data multi-operation system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In some embodiments, the management system 206 may be provided by the IHS 100 discussed above with reference to FIG. 1, and/or may include some or all of the components of the IHS 100, and in specific examples may be provided by one or more management server devices that may be configured to provide management functionality for the computing systems 202*a*-202*c* (e.g., an SCP manager for the SCP subsystems discussed below). In the illustrated embodiment, one or more network-attached devices 208 are also coupled to the network 204.

In an embodiment, the network-attached device(s) 208 may be provided by a variety of different network-attached devices that are accessible to the computing systems 202*a*-202*c* via the network 204, and in specific examples may be provided by one or more Non-Volatile Memory express (NVMe) storage devices that may be configured to provide a network-attached storage system for any or all of the computing systems 202*a*-202*c*. However, while a specific networked system 200 has been illustrated and described, one of skill in the art in possession of the present disclosure will recognize that the graph-based data multi-operation system of the present disclosure may be utilized with a variety of components and component configurations, and/ or may be provided in a variety of computing system/ network configurations, while remaining within the scope of the present disclosure as well.

Figure 3A:
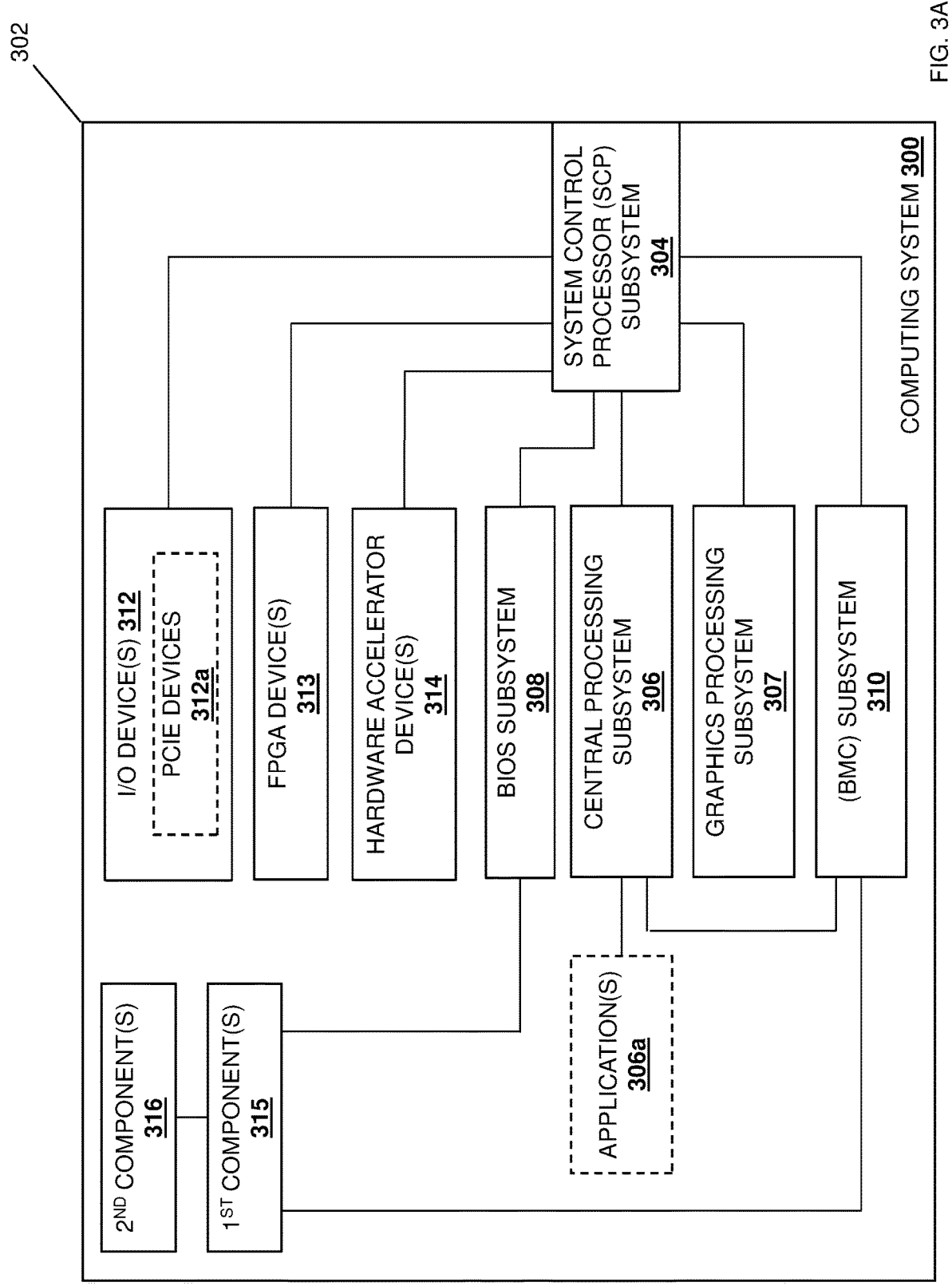
FIG. 3A is a schematic view illustrating an embodiment of a computing system that may be included in the networked system of FIG. 2 and that may utilize the graph-based data multi-operation system of the present disclosure.

Referring now to FIG. 3A, an embodiment of a computing system 300 is illustrated that may provide any or all of the computing systems 202*a*-202*c* discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated below.

For example, the chassis 302 may house a data multi-operation management subsystem that, in the illustrated embodiments is provided by a System Control Processor (SCP) subsystem 304 that is provided according to the teachings of the present disclosure to perform the graph-based data multi-operation functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and the secure communication functionality described by the inventors of the present disclosure in U.S. patent application Ser. No. 17/079,737, filed on Oct. 26, 2020, the disclosures of which is incorporated herein by reference in their entirety. However, while illustrated and described as an enhanced SmartNIC device provided by an SCP subsystem, one of skill in the art in possession of the present disclosure will appreciate that the SCP subsystem 304 may be replaced by a variety of other data multi-operation management subsystems that are configured to perform the functionality discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. As discussed in further detail below, the central processing subsystem 306 may be configured to provide one or more application(s) 306*a* such as, for example, the storage applications (e.g., Software Defined Storage (SDS) applications) discussed below, as well as any other applications that one of skill in the art in possession of the present disclosure will recognize as operating to request the data multi-operations discussed in further detail below.

The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302).

As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well.

The chassis 302 may also house one or more Field Programmable Gate Array (FPGA) device(s) 313 that are coupled to the SCP subsystem 304, and that as discussed below may be programmed to perform any of a variety of data operations and/or other functions for the computing system 300 and/or the SCP subsystem 304. For example, the FPGA device(s) 313 are described below as being programmed to perform compression operations, encryption operations, checksum operations, hash operations, data movement operations, RAID operations, XOR operations, erasure coding operations, text search operations, and/or machine learning inference operations. However, while several specific programmed data operations are described below, one of skill in the art in possession of the present disclosure will appreciate that the FPGA device(s) 313 may be programed to perform any of a variety of programmed data operations while falling within the scope of the present disclosure as well.

The chassis 302 may also house one or more hardware accelerator device(s) 314 that that are coupled to the SCP subsystem 304, and that as discussed below, may be configured to perform any of a variety of data operations and/or other functions for the computing system 300 and/or the SCP subsystem 304. For example, the hardware accelerator device(s) 314 are described below as including one or more compression operation hardware accelerator devices, one or more encryption operation hardware accelerator devices, one or more checksum operation hardware accelerator devices, one or more hash operation hardware accelerator devices, one or more data movement operation hardware accelerator devices, one or more RAID operation hardware accelerator devices, one or more XOR operation hardware accelerator devices, one or more erasure coding operation hardware accelerator devices, one or more text search operation hardware accelerator devices, and/or one or more machine learning inference operation hardware accelerator devices. However, while several specific hardware accelerator devices are described below, one of skill in the art in possession of the present disclosure will appreciate that any of a variety of hardware accelerator devices while falling within the scope of the present disclosure as well.

Figure 3B:
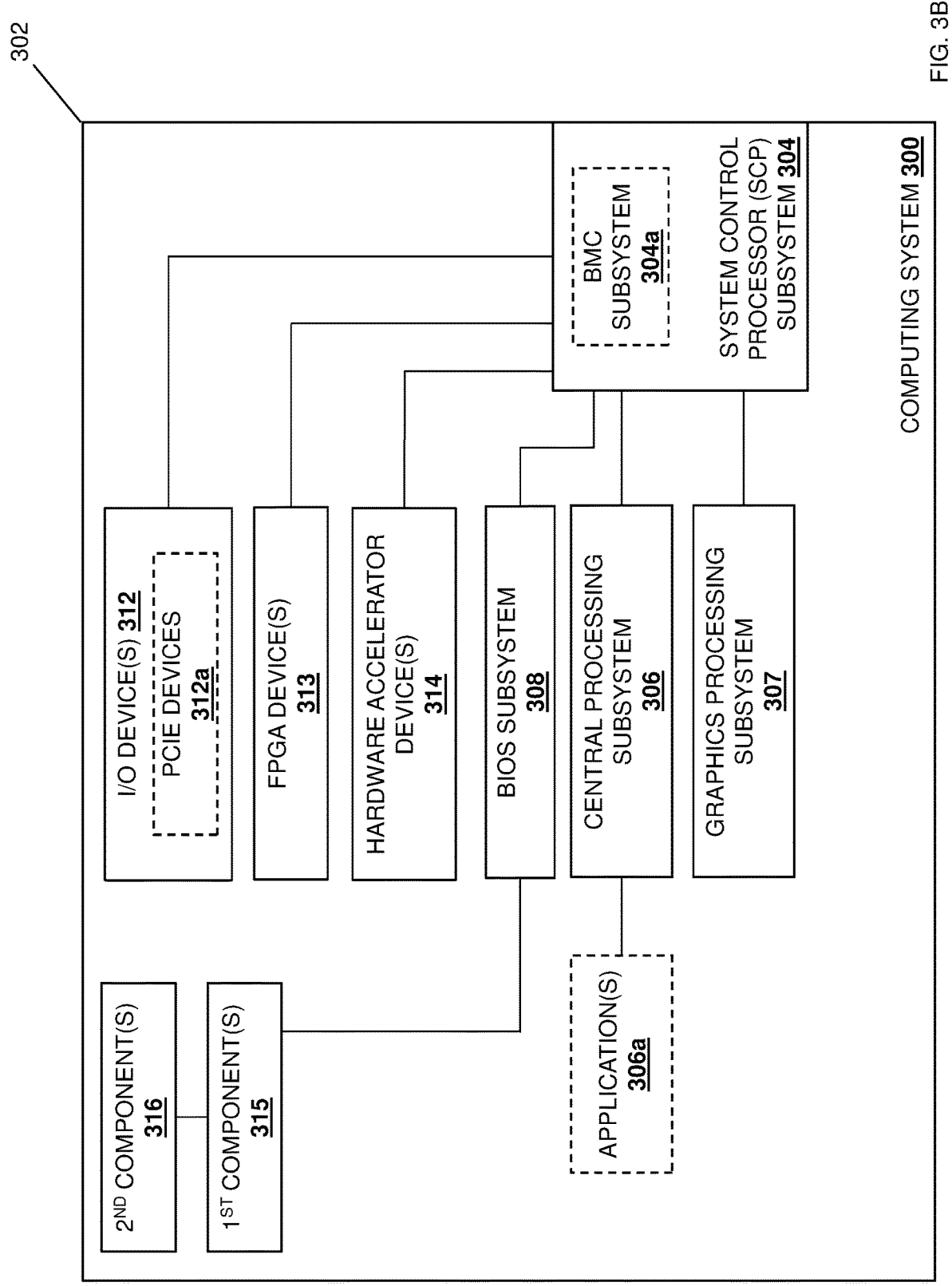
FIG. 3B is a schematic view illustrating an embodiment of a computing system that may be included in the networked system of FIG. 2 and that may utilize the graph-based data multi-operation system of the present disclosure.

The chassis 302 may also house one or more first components 315 that are coupled to each of the BIOS subsystem 308 and the BMC subsystem 310, and one or more second components 316 that are coupled to at least one of the first components 315. In specific examples, the first component(s) 315 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
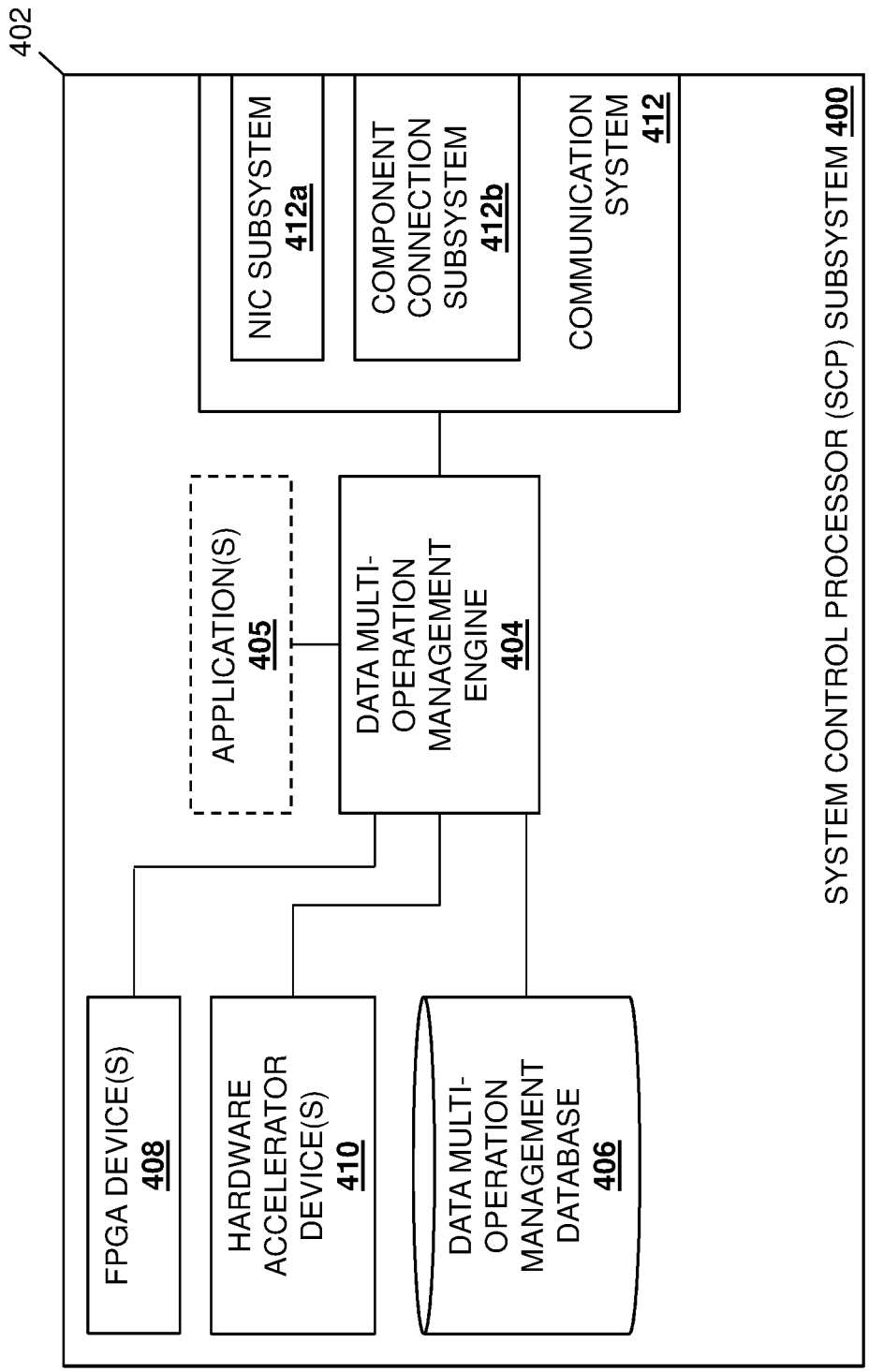
FIG. 4 is a schematic view illustrating an embodiment of an SCP subsystem that may be included in the computing system of FIG. 3A or 3B, and that may provide the graph-based data multi-operation system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 300, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 502 may support an SCP processing subsystem including one or more SCP processors (not illustrated, but which may include the processor 102 discussed above with reference to FIG. 1) and an SCP memory subsystem (not illustrated, but which may include the memory 114 discussed above with reference to FIG. 1) that is coupled to the SCP processing subsystem and that includes instructions that, when executed by the SCP processing subsystem, cause the SCP processing subsystem to provide a data multi-operation management engine 404 that is configured to perform the functionality of the data multi-operation management engines and/or SCP subsystems discussed below. As discussed in further detail below, the SCP memory subsystem may also include instructions that, when executed by the SCP processing subsystem, cause the SCP processing subsystem to provide one or more application(s) 405 such as, for example, the storage applications (e.g., Software Defined Storage (SDS) applications) discussed below, as well as any other applications that one of skill in the art in possession of the present disclosure will recognize as operating to request the data multi-operations discussed in further detail below. In a specific example, the SCP processing subsystem providing the SCP engine 404 may be provided by ARM processor cores in an ARM-based processor, although other processing systems will fall within the scope of the present disclosure as well.

The chassis 402 may also support an SCP storage subsystem (not illustrated, but which may include the storage 108 discussed above with reference to FIG. 1, the SCP memory system discussed above, etc.) that is coupled to the SCP engine 404 (e.g., via a coupling between the SCP storage subsystem and the SCP processing subsystem), and that may include a data multi-operation management database 406 that may store any of the information utilized by the data multi-operation management engine 404 as discussed below.

The chassis 402 may also support one or more Field Programmable Gate Array (FPGA) device(s) 408 that are coupled to the data multi-operation management engine 404 (e.g., via a coupling between the FPGA device(s) 408 and the SCP processing subsystem), and that as discussed below may be programmed to perform any of a variety of data operations and/or other functions for the computing system 300 and/or the SCP subsystem 304/400. For example, the FPGA device(s) 408 are described below as being programmed to perform compression operations, encryption operations, checksum operations, hash operations, data movement operations, RAID operations, XOR operations, erasure coding operations, text search operations, and/or machine learning inference operations. However, while several specific programmed data operations are described below, one of skill in the art in possession of the present disclosure will appreciate that the FPGA device(s) 408 may be programed to perform any of a variety of programmed data operations while falling within the scope of the present disclosure as well.

The chassis 402 may also house one or more hardware accelerator device(s) 410 that that are coupled to the data multi-operation management engine 404 (e.g., via a coupling between the FPGA device(s) 408 and the SCP processing subsystem), and that as discussed below, may be configured to perform any of a variety of data operations and/or other functions for the computing system 300 and/or the SCP subsystem 304/400. For example, the hardware accelerator device(s) 410 are described below as including one or more compression operation hardware accelerator devices, one or more encryption operation hardware accelerator devices, one or more checksum operation hardware accelerator devices, one or more hash operation hardware accelerator devices, one or more data movement operation hardware accelerator devices, one or more RAID operation hardware accelerator devices, one or more XOR operation hardware accelerator devices, one or more erasure coding operation hardware accelerator devices, one or more text search operation hardware accelerator devices, and/or one or more machine learning inference operation hardware accelerator devices. However, while several specific hardware accelerator devices are described below, one of skill in the art in possession of the present disclosure will appreciate that any of a variety of hardware accelerator devices will fall within the scope of the present disclosure as well.

The chassis 402 may also support a communication system 412 that is coupled to the data multi-operation management engine 404 (e.g., via a coupling between the communication system 412 and the SCP processing subsystem) and that, in the illustrated embodiment, includes a Network Interface Controller (NIC) subsystem 412a (e.g., an Ethernet subsystem) that is configured to connect the SCP subsystem 400 to the network 204 discussed above with reference to FIG. 2, a component connection subsystem 412b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 412 may include any of the connections between the SCP subsystem 400 and the network 204, the central processing subsystem 306, the graphics processing subsystem 307, the BIOS subsystem 308, the BMC subsystem 310, the I/O device(s) 312, the FPGA device(s) 313, the hardware accelerator devices 314, and/or any other components utilized with the computing system 202a/300. For example, the component connection subsystem 412b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the data multi-operation management engine 404 and the CxL Root .mem/.cache subsystem discussed above, etc.) and/or component configurations for providing the functionality discussed below while remaining within the scope of the present disclosure as well.

Figure 5:
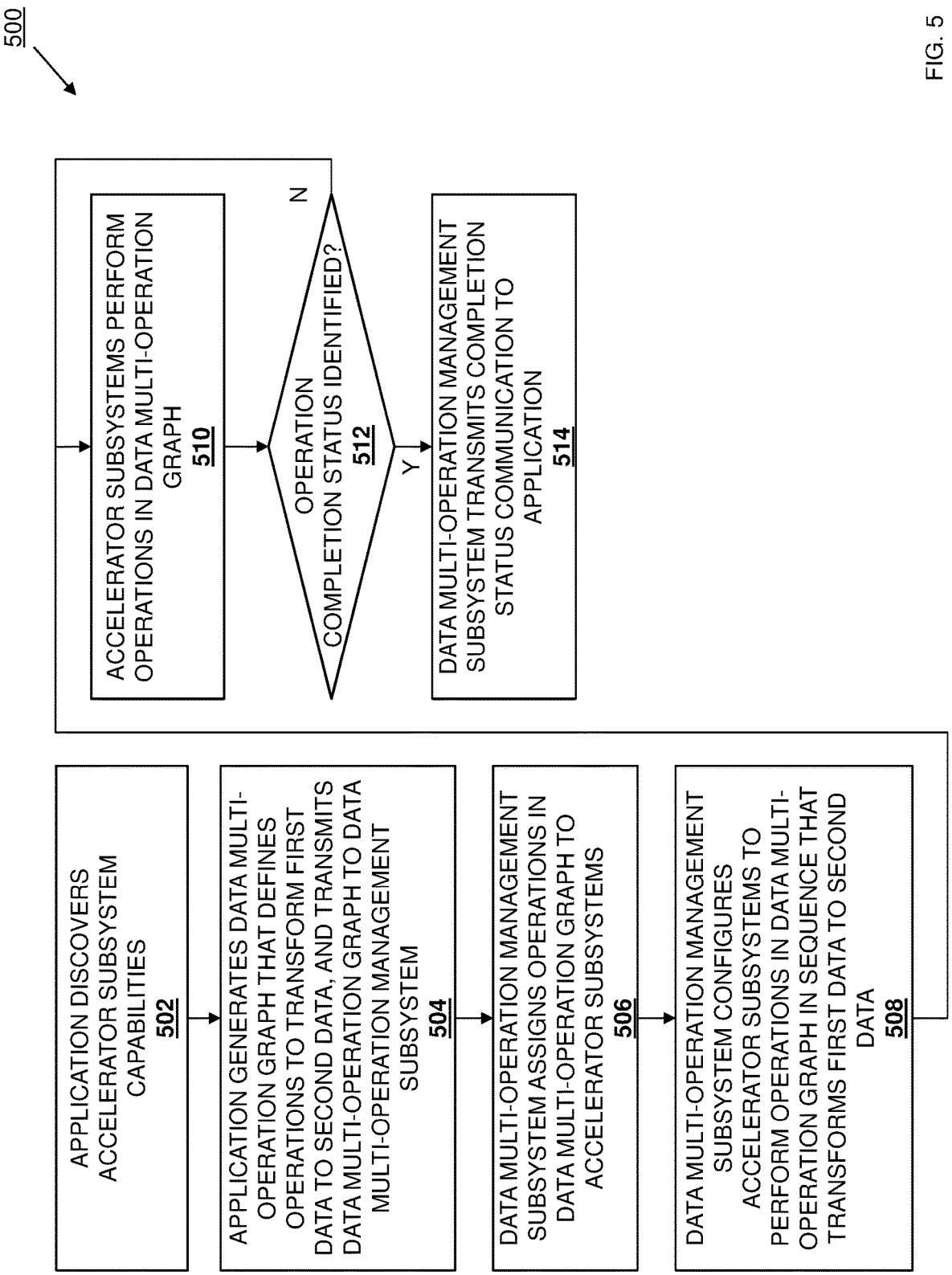
FIG. 5 is a flow chart illustrating an embodiment of a method for providing graph-based data multi-operations.

Referring now to FIG. 5, an embodiment of a method 500 is illustrated for providing graph-based data multi-operations. As discussed below, embodiments of the systems and methods of the present disclosure provide for the abstraction of accelerator subsystems (e.g., dedicated hardware accelerator subsystems, programmable hardware accelerator subsystems, software accelerator subsystems instantiated using processing hardware, etc.) from the storage software stack/applications in a server device, along with the use of a data multi-operation graph to assign multiple data operations to different accelerator subsystems and chain together the data operations performed by those accelerator subsystems in a sequence required to transform data in a desired manner. For example, the graph-based data multi-operation system of the present disclosure may include a data multi-operation management subsystem coupled to an application and accelerator subsystems. The data multi-operation management subsystem receives a data multi-operation graph from the application that identifies first data and defines operations for performance on the first data to transform the first data into second data. The data multi-operation management subsystem assigns each of those operations to at least one of the accelerator systems, and configures the accelerator subsystems to perform the operations in a sequence that transforms the first data into the second data in a manner specified by that data multi-operation graph. When the data multi-operation management subsystem determines a completion status for the performance of the operations by the accelerator subsystems, it transmits a completion status communication to the application that indicates the completion status of the performance of the plurality of operations by the plurality of accelerator subsystems. As such, a single request from the application allows for the performance of complex data operations using multiple accelerator subsystems, followed by a single completion communication to that application to indicate when those data operations are completed, thus decreasing costs and time associated with the implementation and use of accelerator subsystems.

The method 500 may begin at block 502 where an application discovers accelerator subsystem capabilities. As discussed above, the central processing subsystem 306 in the computing system 202a/300 may be configured to provide an application 306a and the SCP processing subsystem/SCP memory subsystem in the SCP subsystem 304/400 may be configured to provide an application 405, and either of those applications 306a/405 may operate at block 502 to discover application subsystems capabilities. As such, the method 500 may be performed for an application 306a operating in the computing system 202a/300 and outside of the SCP subsystem 304/400, or for an application 405 provided in the SCP subsystem 304/400, and one of skill in the art in possession of the present disclosure will appreciate how a variety of applications (e.g., SDS applications, etc.) may require the transformation of data described below (e.g., as part of an SDS systems, etc.) while remaining within the scope of the present disclosure as well.

Thus, in some embodiments of block 502, the application 306a may communicate with the data multi-operation management engine 404 in the SCP subsystem 304/400 in the computing system 202a/300 to discovery accelerator subsystem capabilities, while in other embodiments of block 502, the application 405 may communicate with the data multi-operation management engine 404 in the SCP subsystem 304/400 in the computing system 202a/300 to discovery accelerator subsystem capabilities. In some examples, the data multi-operation management engine 404 in the SCP subsystem 304/400 in the computing system 202a/300 may be configured to identify the abilities of any accelerator subsystem that is accessible to the SCP subsystem 304/400 in the computing system 202a/300, including dedicated hardware accelerator subsystems (e.g., the hardware accelerator device(s) 410 in the SCP subsystem 304/400 in the computing system 202a/300, the hardware accelerator device(s) 314 in the computing system 202a/300, hardware accelerator device(s) included in the network-attached device(s) 208, etc.), programmable hardware accelerator subsystems (e.g., the FPGA device(s) 408 in the SCP subsystem 304/400 in the computing system 202a/300, the FPGA device(s) 313 in the computing system 202a/300, FPGA device(s) included in the network-attached device(s) 208, etc.), software accelerator subsystems instantiated using processing hardware (e.g., accelerator engine(s) that may be instantiated by the SCP processing subsystem and SCP memory subsystem in the SCP subsystem 304/400 in the computing system 202a/300), and/or any other accelerator subsystems known in the art.

As such, in response to communications from the application 306a or the application 405, the data multi-operation management engine 404 in the SCP subsystem 304/400 in the computing system 202a/300 may report any accelerator subsystem capabilities that are accessible via the SCP subsystem 304/400 in the computing system 202a/300. In the examples below, the accelerator subsystem capabilities are described as including compression operation capabilities, encryption operation capabilities, checksum operation capabilities, hash operation capabilities, data movement operation capabilities, RAID operation capabilities, XOR operation capabilities, erasure coding operation capabilities, text search operation capabilities, and/or machine learning inference operation capabilities. However, while several specific accelerator subsystem capabilities are described below, one of skill in the art in possession of the present disclosure will appreciate that any of a variety of accelerator subsystem capabilities will fall within the scope of the present disclosure as well.

Furthermore, while the applications 306a and 405 are described as discovering accelerator subsystem capabilities via the data multi-operation management engine 404 in the SCP subsystem 304/400 in their computing system 202a/300, one of skill in the art in possession of the present disclosure will appreciate that, in other examples, the applications 306a and 405 may discover accelerator subsystem capabilities via other subsystems in the computing system 202a/300 (e.g., the BMC subsystem 310, via a local storage system, via a remote storage system (e.g., through the network 204), etc.), or by themselves (e.g., via direct communications with those accelerator subsystems), while remaining within the scope of the present disclosure as well. As such, following block 502, the application 306a or 405 may have identified each accelerator subsystem capability that is available/accessible via the SCP subsystem 304/400 in the computing system 202a/300 for use by that application in transforming data and/or performing any other data operations (e.g., as part of SDS operations performed by that SDS application).

The method 500 then proceeds to block 504 where the application generates a data multi-operation graph that defines operations to transform first data to second data, and transmits the data multi-operation graph to a data multi-operation management subsystem. In an embodiment, at block 504 in subsequent to discovering each accelerator subsystem capability that is available via the SCP subsystem 304/400 in the computing system 202a/300, the application 306a or 405 may generate a data multi-operation graph that defines data operations to transform data in a desired manner. For example, at block 504, the application 306 or 405 may identify an Input/Output (I/O) instruction that requires data operations to transform data in a desired manner and, in response, will generate a corresponding data multi-operation graph that defines those data operations in a sequence that provides for that data transformation. As will be appreciated by one of skill in the art in possession of the present disclosure, the I/O instruction in the example above may be part of an instruction set (e.g., an SDS instruction set executed by the application 306a or 405), may be received from a user via an input device or the network 204, and/or may be identified in any of a variety of other manners that would be apparent to one of skill in the art in possession of the present disclosure. Furthermore, while the generation of the data multi-operation graph is described as being performed in response to an I/O instruction, one of skill in the art in possession of the present disclosure will appreciate that the data multi-operation graphs of the present disclosure may be generated in response to any need to perform multiple data operations while remaining within the scope of the present disclosure as well.

Figure 6:
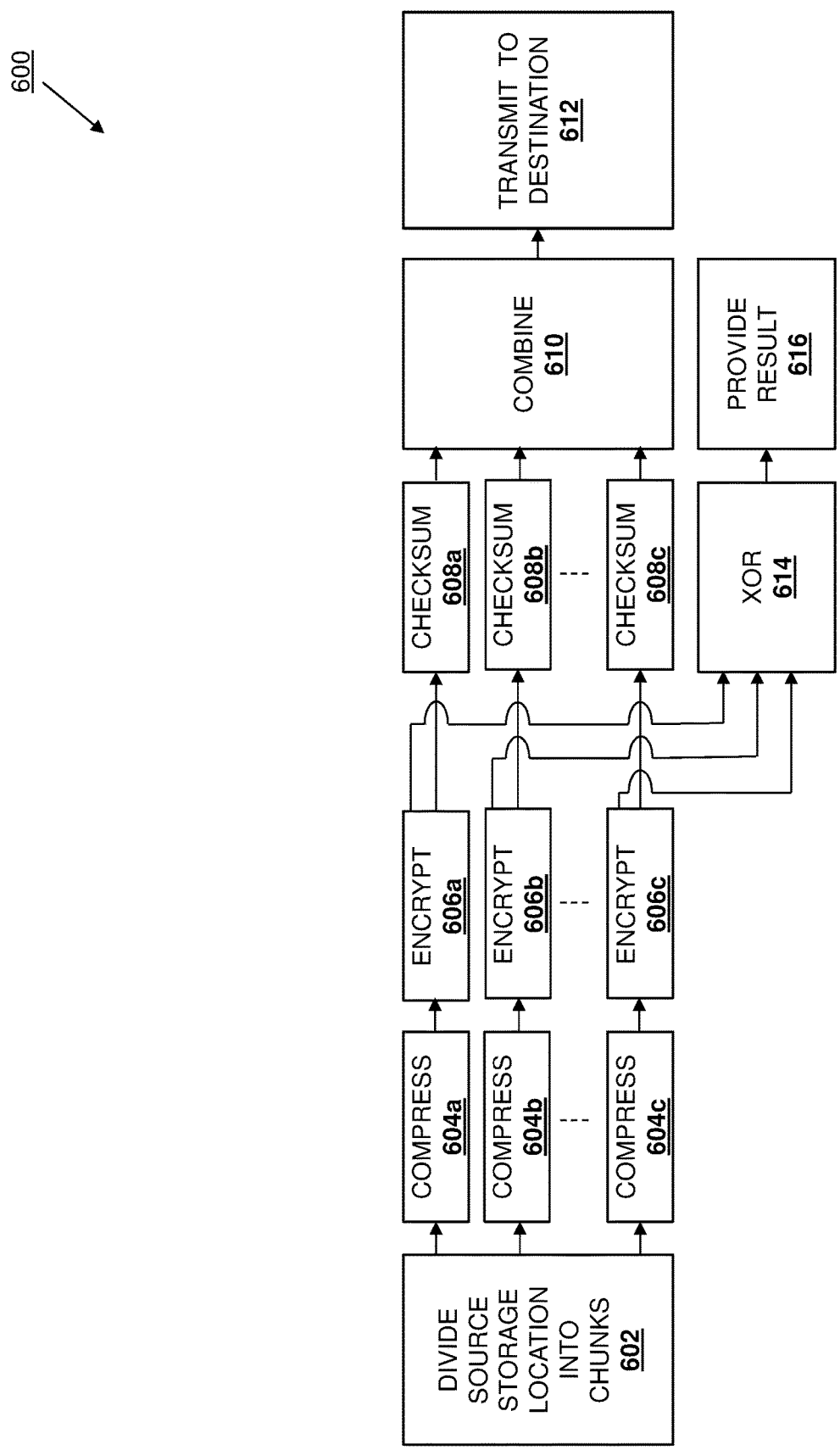
FIG. 6 is a schematic view illustrating an embodiment of data multi-operation graph that may be utilized during the method of FIG. 5.

With reference to FIG. 6, an embodiment of a data multi-operation graph 600 is illustrated for the purposes of the discussion below. One of skill in the art in possession of the present disclosure will recognize that the example of the data multi-operation graph 600 provided below describes a plurality of operations that accomplish a RAID function, but will appreciate that data multi-operation graphs may define any data operations to transform data in any desired manner while remaining within the scope of the present disclosure as well. In the illustrated example, the data multi-operation graph 600 includes a source location data operation 602 that provides for the division of a source location of data into a plurality of "chunks" (e.g., the division of a 16 K buffer in a source memory buffer into four 4 K chunks). The data multi-operation graph 600 also includes a plurality of compress operations 604a, 604b, and up to 604c, each of which provide for the compression of data in in a respective one of the chunks provided via the source location data operation 602 in order to produce compressed data chunks. The data multi-operation graph 600 also includes a plurality of encrypt operations 606a, 606b, and up to 606c, each of which provide for the encryption of the compressed data in a respective one of the compressed data chunks provided via the source location data operation 602 and the compress operations 604a-604c in order to produce encrypted, compressed data chunks.

The data multi-operation graph 600 also includes a plurality of checksum operations 608a, 608b, and up to 608c, each of which provide for the generation of a checksum for the encrypted, compressed data in a respective one of the encrypted, compressed data chunks provided via the source location data operation 602, the compress operations 604a-604c, and the encrypt operations 606a/606c, in order to generate respective checksums for each encrypted, compressed data chunk, and add each respective checksum to its corresponding encrypted, compressed data chunk. The data multi-operation graph 600 also includes a combine operation 610 that provides for the combination of the encrypted, compressed data chunks (and their corresponding checksums) provided via the source location data operation 602, the compress operations 604a-604c, the encrypt operations 606a/606c, and the checksum operations 608a-608c. The data multi-operation graph 600 also includes a destination location data operation 612 that provides for the transmission of the combined encrypted, compressed data chunks (and their corresponding checksums) provided via the source location data operation 602, the compress operations 604a-604c, the encrypt operations 606a/606c, the checksum operations 608a-608c, and the combine operation 610, to a destination location.

The data multi-operation graph 600 also includes an XOR operation 614 that is performed on the encrypted, compressed data chunks (and their corresponding checksums) provided via the source location data operation 602, the compress operations 604a-604c, the encrypt operations 606a/606c, and the checksum operations 608a-608c, in order to generate an XOR result. The data multi-operation graph 600 also includes a result provisioning data operation 616 that provides for the transmission of the XOR result provided via the source location data operation 602, the compress operations 604a-604c, the encrypt operations 606a/606c, the checksum operations 608a-608c, and the XOR operation 614, to a result location. However, while specific data operations are illustrated and described with reference to the data multi-operation graph 600 to perform a particular data transformation, one of skill in the art in possession of the present disclosure will recognize any desired data transformation may be broken down into a plurality of data operations (e.g., hash operations, other RAID operations, erasure coding operations, text search operations, machine learning inference operations, etc., in addition to the operations described in the specific example above) in a similar data multi-operation graph that accomplish that data transformation while remaining within the scope of the present disclosure as well.

In some embodiments, the generation of the data multi-operation graph may include simply selecting (i.e., in response to the I/O instruction discussed above) one of a plurality of pre-configured data multi-operation graphs that are accessible to the application 306a or 405 (e.g., stored in an accessible graph library of cached data multi-operation graphs) and that perform the data transformation desired by the application and/or I/O instruction. Furthermore, the selection of any pre-configured graph may be based on one or more policies. For example, data multi-operation graphs (or portions of data multi-operation graphs) may be automatically generated based on, for example, a user identifier of a user of the application that is generating that data multi-operation graph, one or more policies, and/or other considerations that would be apparent to one of skill in the art in possession of the present disclosure. As such, for a particular user, any data operations or resulting data may be copied to a result location based on a policy of reviewing data accessed and/or manipulated by that user, and one of skill in the art in possession of the present disclosure will appreciate how other data operations may be added to any data multi-operation graph based on the user signed in to the application generating that data multi-operation graph, based on policies associated with that user or that application, and/or based on other factors as well.

Figure 7A:
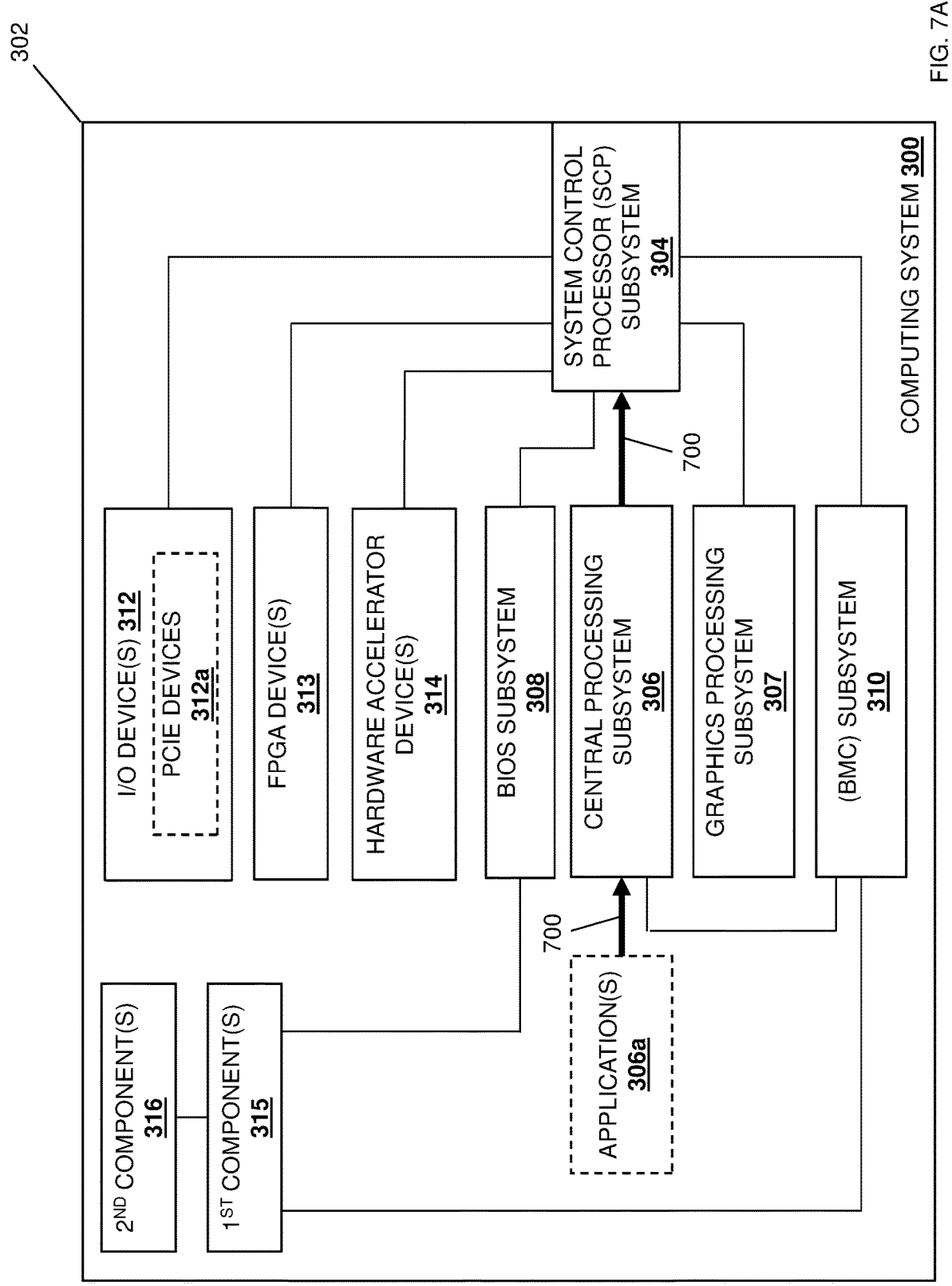
FIG. 7A is a schematic view illustrating an embodiment of the computing system of FIG. 3A operating during the method of FIG. 5.
Figure 7B:
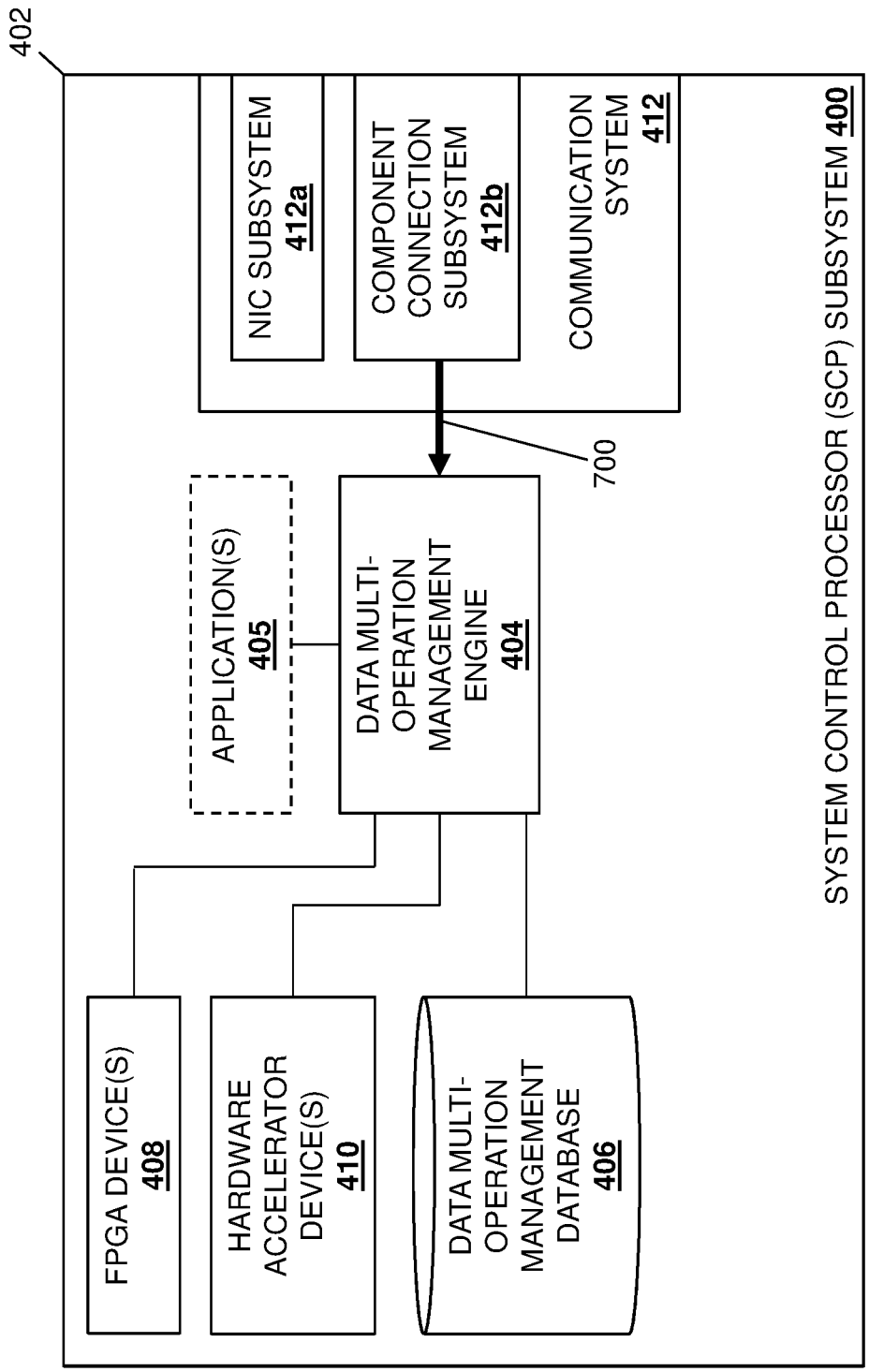
FIG. 7B is a schematic view illustrating an embodiment of the SCP subsystem of FIG. 4 operating during the method of FIG. 5.
Figure 7C:
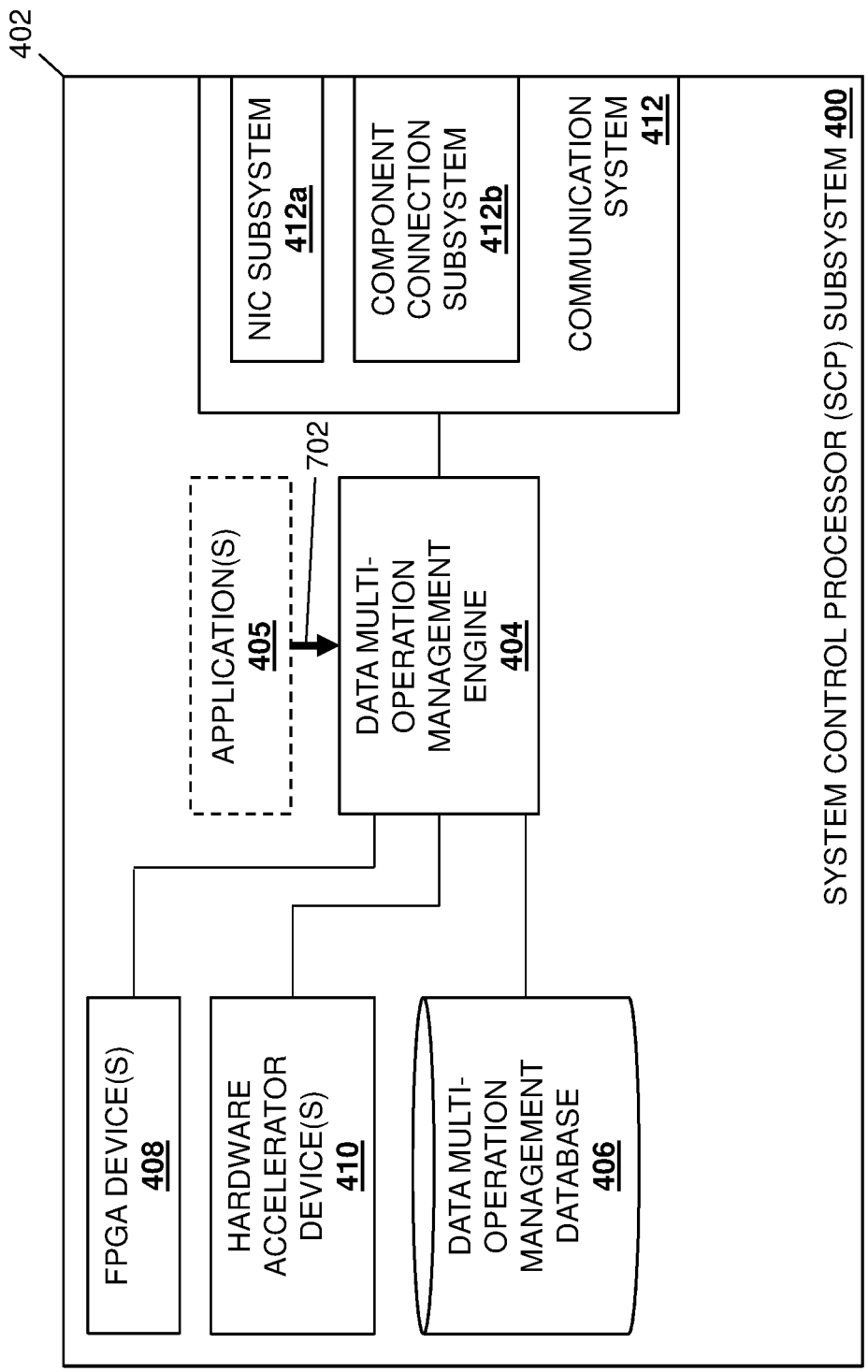
FIG. 7C is a schematic view illustrating an embodiment of the SCP subsystem of FIG. 4 operating during the method of FIG. 5.

With reference to FIGS. 7A and 7B, in some embodiments of block 504 and following the generation of the data multi-operation graph 600, the application 306a may perform data multi-operation graph transmission operations 700 to transmit the data multi-operation graph 600 (e.g., via the central processing subsystem 306 in the computing system 202a/300) to the SCP subsystem 304/400 in the computing system 202a/300 such that the data multi-operation management engine 404 in that SCP subsystem 304/400 receives that data multi-operation graph 600 via the component connection subsystem 412b in its communication subsystem 412. With reference to FIG. 7C, in some embodiments of block 504 and following the generation of the data multi-operation graph 600, the application 405 in the SCP subsystem 304/400 in the computing system 202a/300 may perform data multi-operation graph transmission operations 700 to transmit the data multi-operation graph 600 to the data multi-operation management engine 404 in that SCP subsystem 304/400. However, while two different application scenarios have been described, one of skill in the art in possession of the present disclosure will appreciate that the data multi-operation management engine 404/SCP subsystem 400 may receive data multi-operation graphs from any application in any location while remaining within the scope of the present disclosure as well.

In some embodiments, the transmission of the data multi-operation graph at block 504 may be accomplished via an Application Programming Interface (API) such as, for example, a hardware API interface for data plane hardware programmability, as well as other API interfaces that would be apparent to one of skill in the art in possession of the present disclosure as providing for the transmission of the data multi-operation graph described herein. For example, a hardware API interface for data plane hardware programmability for transmitting the data multi-operation graph may identify the data source location of the data that will be transformed using the data multi-operation graph ("<S>"), the data destination location for the data transformed using the data multi-operation graph ("<D>"), an optional data results location for the results of analytics performed on the data transformed using the data multi-operation graph ("<R>"), and the data multi-operation graph ("<G>"):

[<S>, <D>, <R>, <G>]

In specific examples, the data source location <S> may identify any location in memory, a storage drive or other storage device, a tuple identifying data accessible via the network 204, and/or other data source location information that would be apparent to one of skill in the art in possession of the present disclosure. In another specific example, the data destination location <D> may identify any location in memory, a storage drive or other storage device, a network destination and transport protocol where data should be sent or results should be posted, and/or other data destination location information that would be apparent to one of skill in the art in possession of the present disclosure. In another specific example, the optional results <R> may identify a location in memory where results of an analytics operation (i.e., in addition to data transformation/movement operations) should be provided, and/or other results information that would be apparent to one of skill in the art in possession of the present disclosure. In another specific example, the data multi-operation graph <G> described herein may be expressed in JavaScript Object Notation (JSON) format and/or other manners that would be apparent to one of skill in the art in possession of the present disclosure. However, while a specific example is provided, one of skill in the art in possession of the present disclosure will appreciate how data source locations, data destination locations, data multi-operation graphs, and optional data results locations may be defined and transmitted to a data multi-operation management subsystem while remaining within the scope of the present disclosure as well.

The method 500 then proceeds to block 506 where the data multi-operation management subsystem assigns the operations in the data multi-operation graph to accelerator subsystems. In an embodiment, at block 506 and in response to receiving the data multi-operation graph, the data multi-operation management engine 404 in the SCP subsystem 304/400 in the computing system 202a/300 may operate to assign operations identified in that data multi-operation graph to accelerator subsystems that are accessible to the SCP subsystem 304/400 in the computing system 202a/300. For example, with reference to the data multi-operation graph 600, at block 506 the data multi-operation management engine 404 in the SCP subsystem 304/400 in the computing system 202a/300 may operate to assign the source location data operation 602 to a dedicated hardware accelerator subsystem (e.g., a hardware accelerator device 410 in the SCP subsystem 304/400 in the computing system 202a/300, a hardware accelerator device 314 in the computing system 202a/300, a hardware accelerator device included in the network-attached device(s) 208, etc.), a programmable hardware accelerator subsystem (e.g., an FPGA device 408 in the SCP subsystem 304/400 in the computing system 202a/300, an FPGA device 313 in the computing system 202a/300, an FPGA device included in the network-attached device(s) 208, etc.), a software accelerator subsystem instantiated using processing hardware (e.g., an accelerator engine that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the plurality of compress operations 604a, 604b, and up to 604c to one or more dedicated hardware accelerator subsystems (e.g., hardware accelerator device(s) 410 in the SCP subsystem 304/400 in the computing system 202a/300, hardware accelerator device(s) 314 in the computing system 202a/300, hardware accelerator device(s) included in the network-attached device(s) 208, etc.), programmable hardware accelerator subsystem(s) (e.g., FPGA device(s) 408 in the SCP subsystem 304/400 in the computing system 202a/300, FPGA device(s) 313 in the computing system 202a/300, FPGA device(s) included in the network-attached device(s) 208, etc.), software accelerator subsystem(s) instantiated using processing hardware (e.g., accelerator engine(s) that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the plurality of encrypt operations 606a, 606b, and up to 606c to one or more dedicated hardware accelerator subsystems (e.g., hardware accelerator device(s) 410 in the SCP subsystem 304/400 in the computing system 202a/300, hardware accelerator device(s) 314 in the computing system 202a/300, hardware accelerator device(s) included in the network-attached device(s) 208, etc.), programmable hardware accelerator subsystem(s) (e.g., FPGA device(s) 408 in the SCP subsystem 304/400 in the computing system 202a/300, FPGA device(s) 313 in the computing system 202a/300, FPGA device(s) included in the network-attached device(s) 208, etc.), software accelerator subsystem(s) instantiated using processing hardware (e.g., accelerator engine(s) that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the plurality of checksum operations 608a, 608b, and up to 608c to one or more dedicated hardware accelerator subsystems (e.g., hardware accelerator device(s) 410 in the SCP subsystem 304/400 in the computing system 202a/300, hardware accelerator device(s) 314 in the computing system 202a/300, hardware accelerator device(s) included in the network-attached device(s) 208, etc.), programmable hardware accelerator subsystem(s) (e.g., FPGA device(s) 408 in the SCP subsystem 304/400 in the computing system 202a/300, FPGA device(s) 313 in the computing system 202a/300, FPGA device(s) included in the network-attached device(s) 208, etc.), software accelerator subsystem(s) instantiated using processing hardware (e.g., accelerator engine(s) that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the combine operation 610 to a dedicated hardware accelerator subsystem (e.g., a hardware accelerator device 410 in the SCP subsystem 304/400 in the computing system 202a/300, a hardware accelerator device 314 in the computing system 202a/300, a hardware accelerator device included in the network-attached device(s) 208, etc.), a programmable hardware accelerator subsystem (e.g., an FPGA device 408 in the SCP subsystem 304/400 in the computing system 202a/300, an FPGA device 313 in the computing system 202a/300, an FPGA device included in the network-attached device(s) 208, etc.), a software accelerator subsystem instantiated using processing hardware (e.g., an accelerator engine that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the destination location data operation 612 to a dedicated hardware accelerator subsystem (e.g., a hardware accelerator device 410 in the SCP subsystem 304/400 in the computing system 202a/300, a hardware accelerator device 314 in the computing system 202a/300, a hardware accelerator device included in the network-attached device(s) 208, etc.), a programmable hardware accelerator subsystem (e.g., an FPGA device 408 in the SCP subsystem 304/400 in the computing system 202a/300, an FPGA device 313 in the computing system 202a/300, an FPGA device included in the network-attached device(s) 208, etc.), a software accelerator subsystem instantiated using processing hardware (e.g., an accelerator engine that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the XOR operation 614 to a dedicated hardware accelerator subsystem (e.g., a hardware accelerator device 410 in the SCP subsystem 304/400 in the computing system 202a/300, a hardware accelerator device 314 in the computing system 202a/300, a hardware accelerator device included in the network-attached device(s) 208, etc.), a programmable hardware accelerator subsystem (e.g., an FPGA device 408 in the SCP subsystem 304/400 in the computing system 202a/300, an FPGA device 313 in the computing system 202a/300, an FPGA device included in the network-attached device(s) 208, etc.), a software accelerator subsystem instantiated using processing hardware (e.g., an accelerator engine that may be instantiated by the SCP processing subsystem and SCP memory subsystem in the SCP subsystem 304/400 in the computing system 202a/300), and/or any other accelerator subsystems known in the art.

Similarly, at block 506 the data multi-operation management engine 404 in the SCP subsystem 304/400 in the computing system 202a/300 may operate to assign the result provisioning data operation 616 to a dedicated hardware accelerator subsystem (e.g., a hardware accelerator device 410 in the SCP subsystem 304/400 in the computing system 202a/300, a hardware accelerator device 314 in the computing system 202a/300, a hardware accelerator device included in the network-attached device(s) 208, etc.), a programmable hardware accelerator subsystem (e.g., an FPGA device 408 in the SCP subsystem 304/400 in the computing system 202a/300, an FPGA device 313 in the computing system 202a/300, an FPGA device included in the network-attached device(s) 208, etc.), a software accelerator subsystem instantiated using processing hardware (e.g., an accelerator engine that may be instantiated by the SCP processing subsystem and SCP memory subsystem in the SCP subsystem 304/400 in the computing system 202a/300), and/or any other accelerator subsystems known in the art.

As such, each of the data operations required in the data multi-operation graph 600 may be assigned by the data multi-operation management engine 404 in the SCP subsystem 304/400 in the computing system 202a/300 to corresponding accelerator subsystems that are accessible to the SCP subsystem 304/400 in the computing system 202a/300 and that are configured (or configurable) to perform that corresponding data operation, and one of skill in the art in possession of the present disclosure will appreciate how the decision on which accelerator subsystems should be assigned which data operations in the data multi-operation graph 600 may be based on a variety of factors (in addition to the ability or configurability to perform the corresponding data operation) including, for example, accelerator subsystem availability, accelerator subsystem security, accelerator subsystem reliability, accelerator subsystem priority, accelerator subsystem connectability, Service Level Agreements (SLAs), and/or any other factor that would be apparent to one of skill in the art in possession of the present disclosure.

The method 500 then proceeds to block 508 where the data multi-operation management subsystem configures the accelerator subsystems to perform operations in the data multi-operation graph in a sequence that transforms first data into second data. As will be appreciated by one of skill in the art in possession of the present disclosure, the assignment of operations in the data multi-operation graph to accelerator subsystems at block 506 and/or the configuration of those accelerator subsystems to perform those operations at block 508 may include the selection of dedicated hardware accelerator device(s) that have the capability to perform one or more data operation(s) identified in the data multi-operation graph (e.g., the selection of hardware accelerator block(s) included in a System On a Chip (SOC) that have the capability to perform one or more data operation(s) in the data multi-operation graph), the programming of programmable hardware accelerator device(s) to perform one or more data operation(s) identified in the data multi-operation graph (e.g., the instantiation of IP engines in an FPGA device), and/or the instantiation of accelerator engines to perform one or more data operation(s) identified in the data multi-operation graph, along with the communicative connection/coupling of those accelerator subsystems (e.g., connection/coupling of data transformation functionality blocks that perform the data operations) as specified by the data multi-operation graph.

Figure 8A:
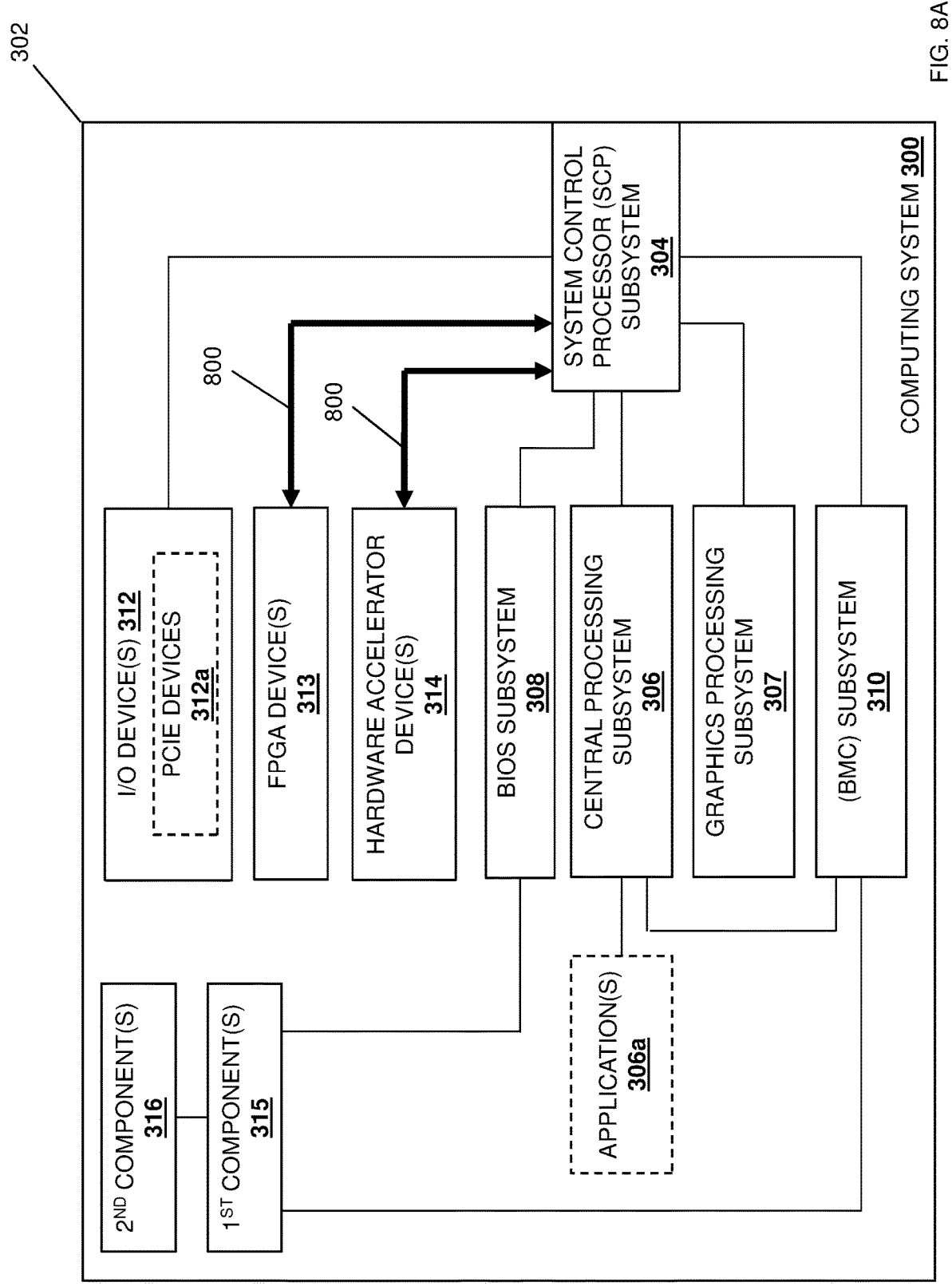
FIG. 8A is a schematic view illustrating an embodiment of the computing system of FIG. 3A operating during the method of FIG. 5.
Figure 8B:
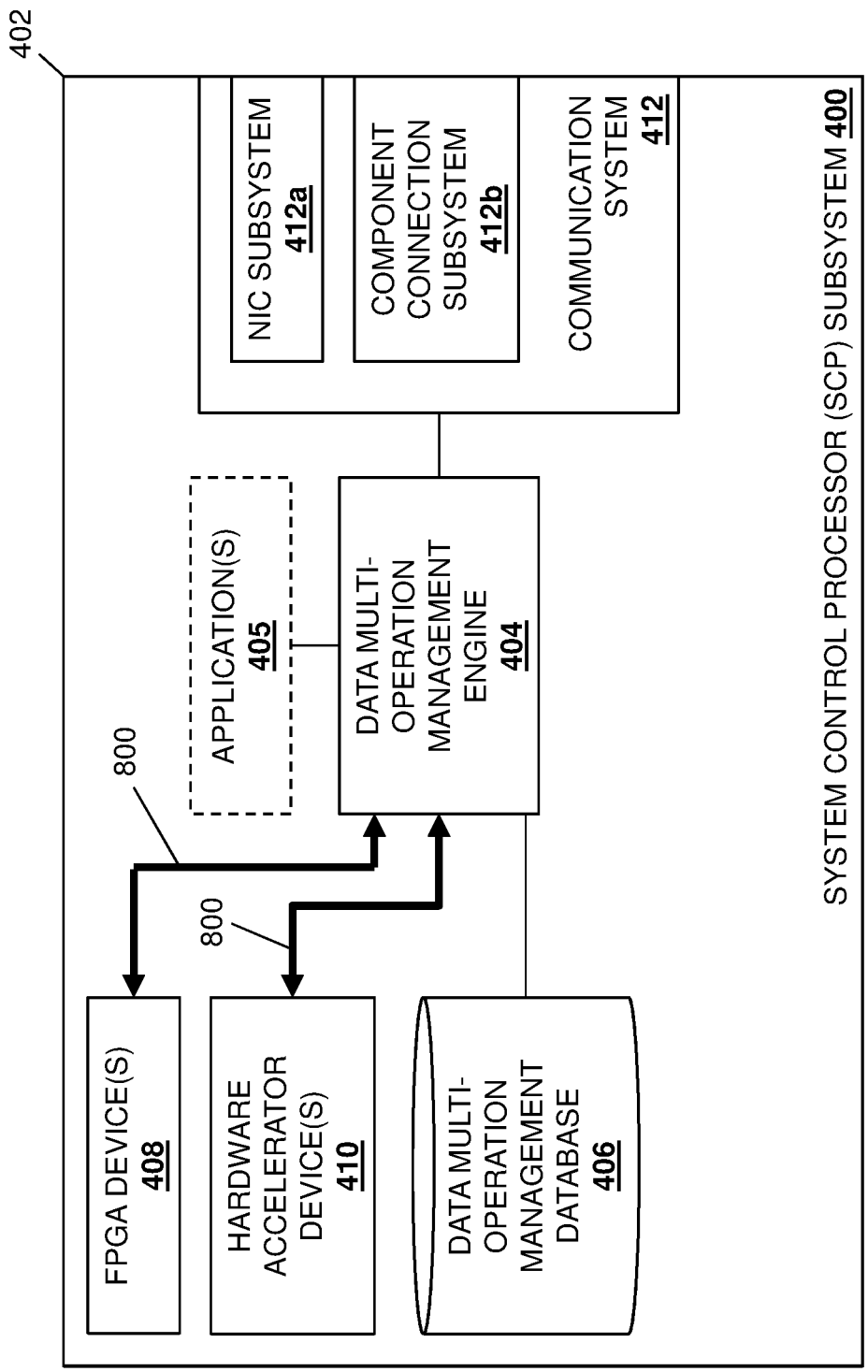
FIG. 8B is a schematic view illustrating an embodiment of the SCP subsystem of FIG. 4 operating during the method of FIG. 5.
Figure 8C:
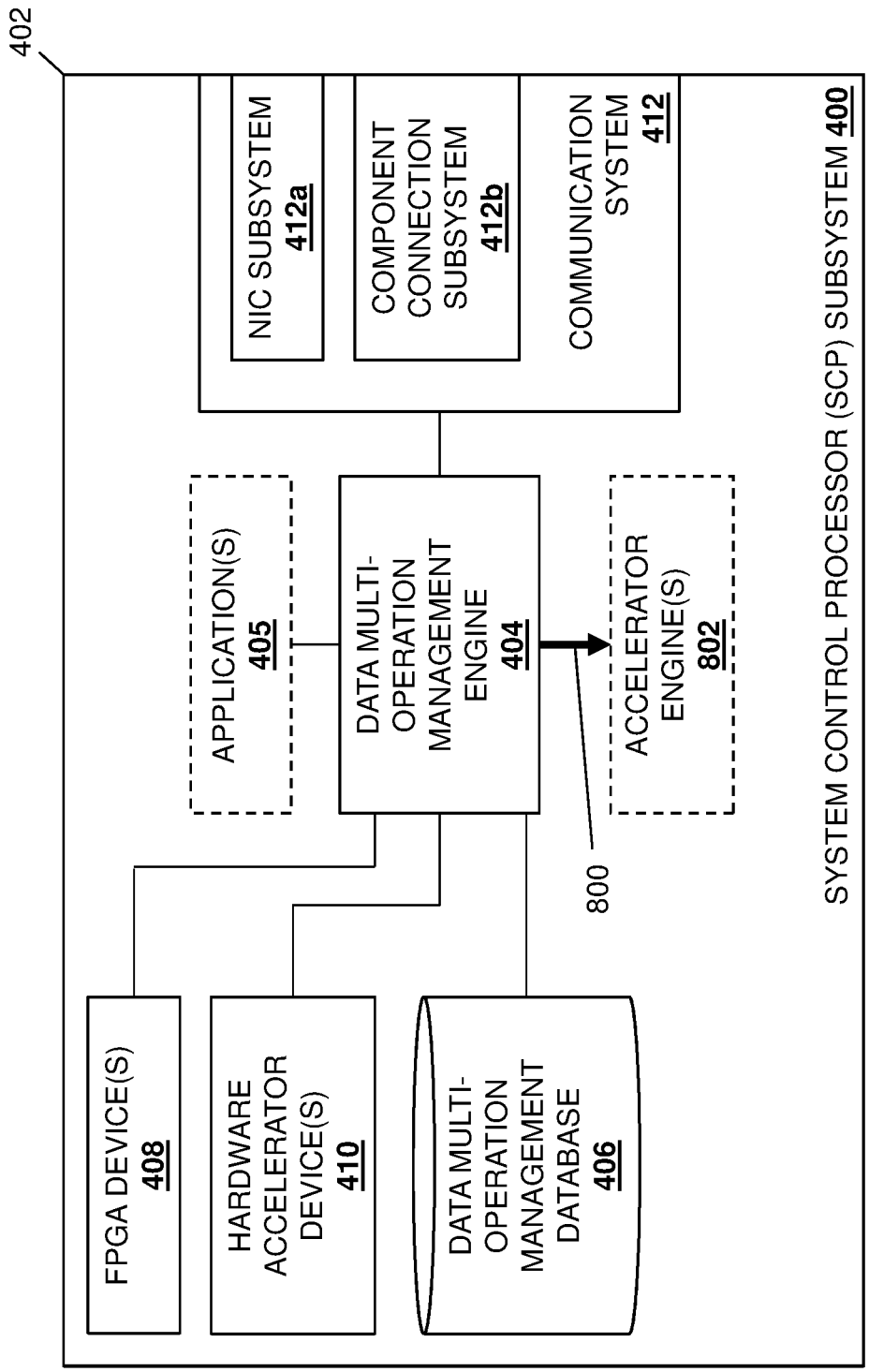
FIG. 8C is a schematic view illustrating an embodiment of the SCP subsystem of FIG. 4 operating during the method of FIG. 5.

With reference to FIGS. 8A, 8B, and 8C, in an embodiment of block 508, the data multi-operation management engine 404 in the SCP subsystem 304/400 in the computing system 202a/300 may perform accelerator subsystem configuration operations 800 that may include any or all of programming one or more of the FPGA device(s) 313 in the computing system 202a/300 to perform the data operation(s) assigned to them at block 506 and configuring them to operate with other accelerator subsystems assigned other data operation assigned at block 506, configuring one or more of the hardware accelerator device(s) 614 in the computing system 202a/300 that were assigned data operation(s) at block 506 to operate with other accelerator subsystems assigned other data operations assigned at block 506, programming one or more of the FPGA device(s) 408 in the SCP subsystem 304/400 in the computing system 202a/300 to perform the data operation(s) assigned to them at block 506 and configuring them to operate with other accelerator subsystems assigned other data operation assigned at block 506, configuring one or more of the hardware accelerator device(s) 614 in the SCP subsystem 304/400 in the computing system 202a/300 that were assigned data operation(s) at block 506 to operate with other accelerator subsystems assigned other data operation assigned at block 506, and/or instantiating one or more accelerator engine(s) 802 to perform the data operation(s) assigned to them at block 506 and configuring them to operate with other accelerator subsystems assigned other data operation assigned at block 506.

In an embodiment, the configuration of the accelerator subsystems at block 508 according to the data multi-operation graph will coordinate the data operations performed by those accelerator subsystems in a sequence that transforms first data located at a data source location into second data that is provided at a data destination location. For example, with reference to the data multi-operation graph 600, the sequence coordinated at block 508 using the data multi-operation graph 600 includes an accelerator subsystem performing the source location data operation 602, one or more accelerator subsystems performing the compress operations 604a-604c, one or more accelerator subsystems performing the encrypt operations 606a-606c, one or more accelerator subsystems performing the checksum operations 608a-608c, an accelerator subsystem performing the combine operation 610, an accelerator subsystem performing the destination location data operation 612, an accelerator subsystem performing the XOR operation 614, and an accelerator subsystem performing the result provisioning data operation 616. Thus, in some embodiments, a sequence coordinated at block 508 according to the data multi-operation graph may include sequential data operations by a plurality of accelerator subsystems, as well as parallel data operations performed by a plurality of accelerator subsystems within that sequence.

Figure 9A:
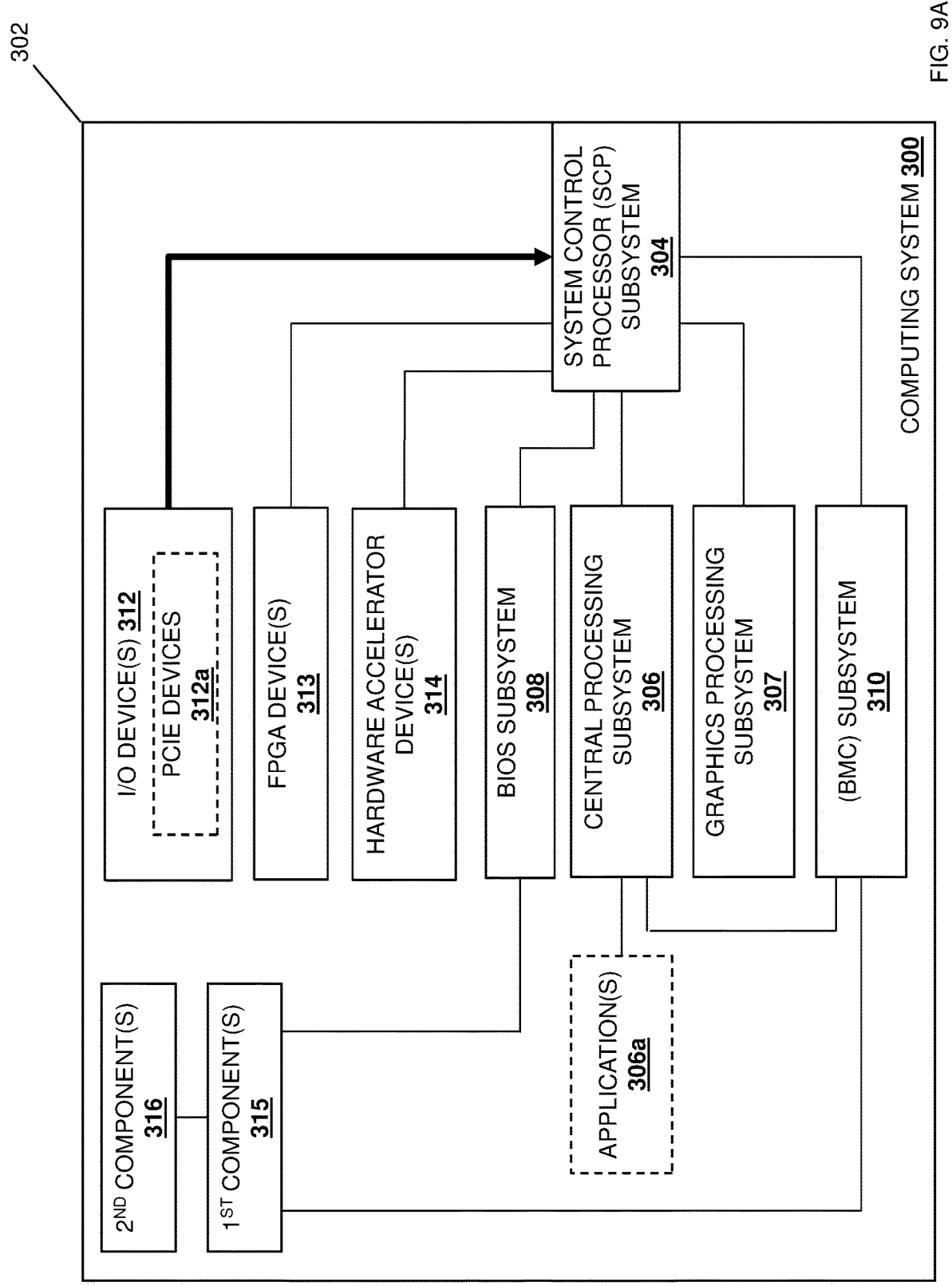
FIG. 9A is a schematic view illustrating an embodiment of the computing system of FIG. 3A operating during the method of FIG. 5.
Figure 9B:
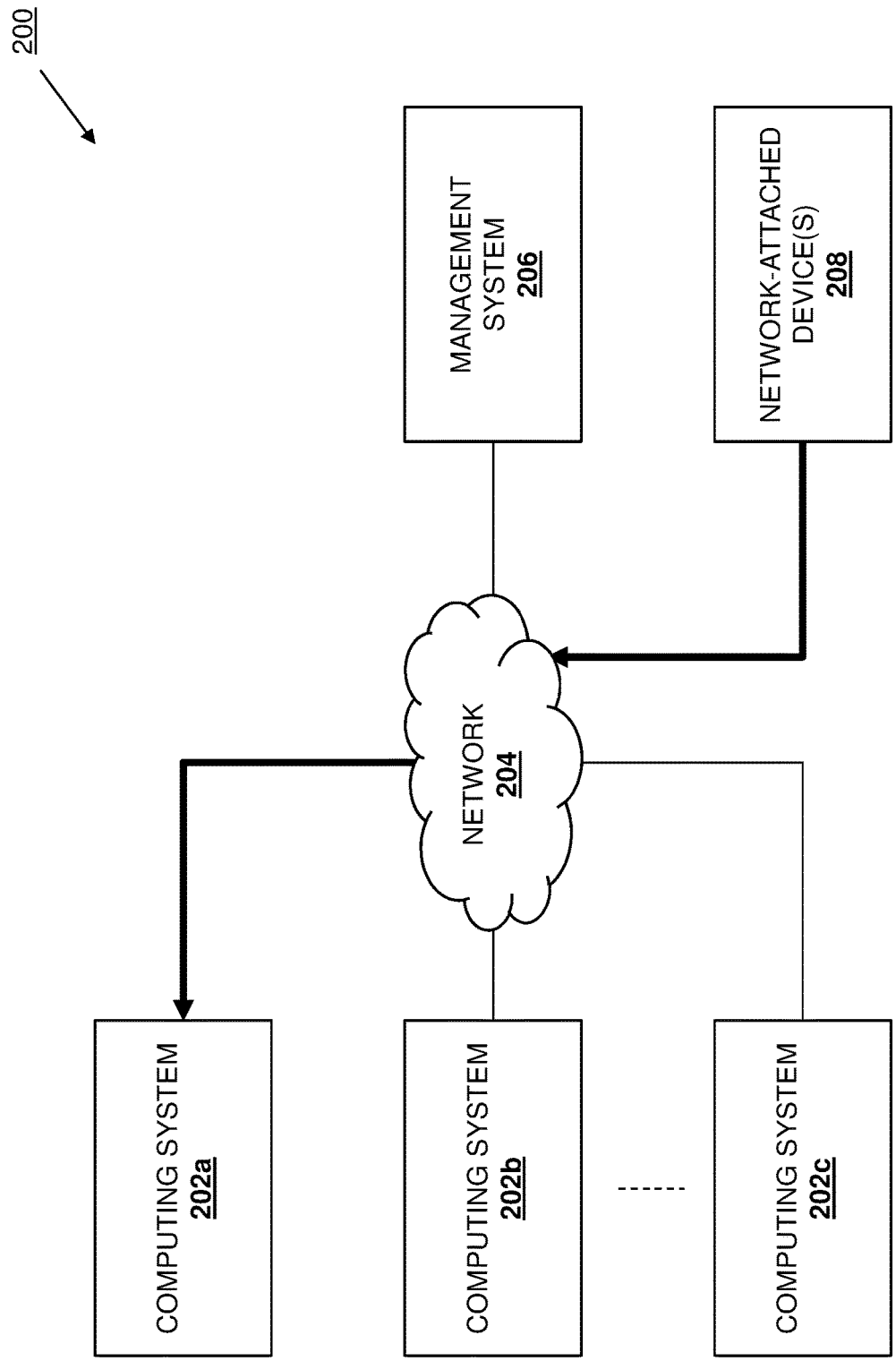
FIG. 9B is a schematic view illustrating an embodiment of the networked system of FIG. 2 operating during the method of FIG. 5.

The method 500 then proceeds to block 510 where the accelerator subsystems perform the operations in the data multi-operation graph. In an embodiment, at block 510, the accelerator subsystem assigned data operations at block 506 and configured at block 508 may operate to perform the data operations in the data multi-operation graph. With reference to the data multi-operation graph 600 and based on the assignment and configuration operations at blocks 506 and 508, at block 510 an accelerator subsystem may perform the source location data operation 602. For example, with reference to FIG. 9A, the source location of data may include the I/O device(s) 312 (e.g., an NVMe storage device provided by the PCIe devices 312a), and at block 510 one or more accelerator subsystems may perform the source location data operation 602 that provides for the division of a source location of data into a plurality of "chunks", as well as a data transfer operations that transfers those chunks to the SCP subsystem 304 (e.g., to an accelerator subsystem included in the SCP subsystem 304 to coupled to the SCP subsystem 304). In another example, with reference to FIG. 9B, the source location of data may include the network-attached device(s) 208 (e.g., an NVMe storage device included in a network-attached storage system), and at block 510 one or more accelerator subsystems may perform the source location data operation 602 that provides for the division of a source location of data into a plurality of "chunks", as well as a data transfer operations that transfers those chunks those chunks via the network to the SCP subsystem 304 in the computing system 202a/300 (e.g., to an accelerator subsystem included in the SCP subsystem 304 to coupled to the SCP subsystem 304).

Figure 10A:
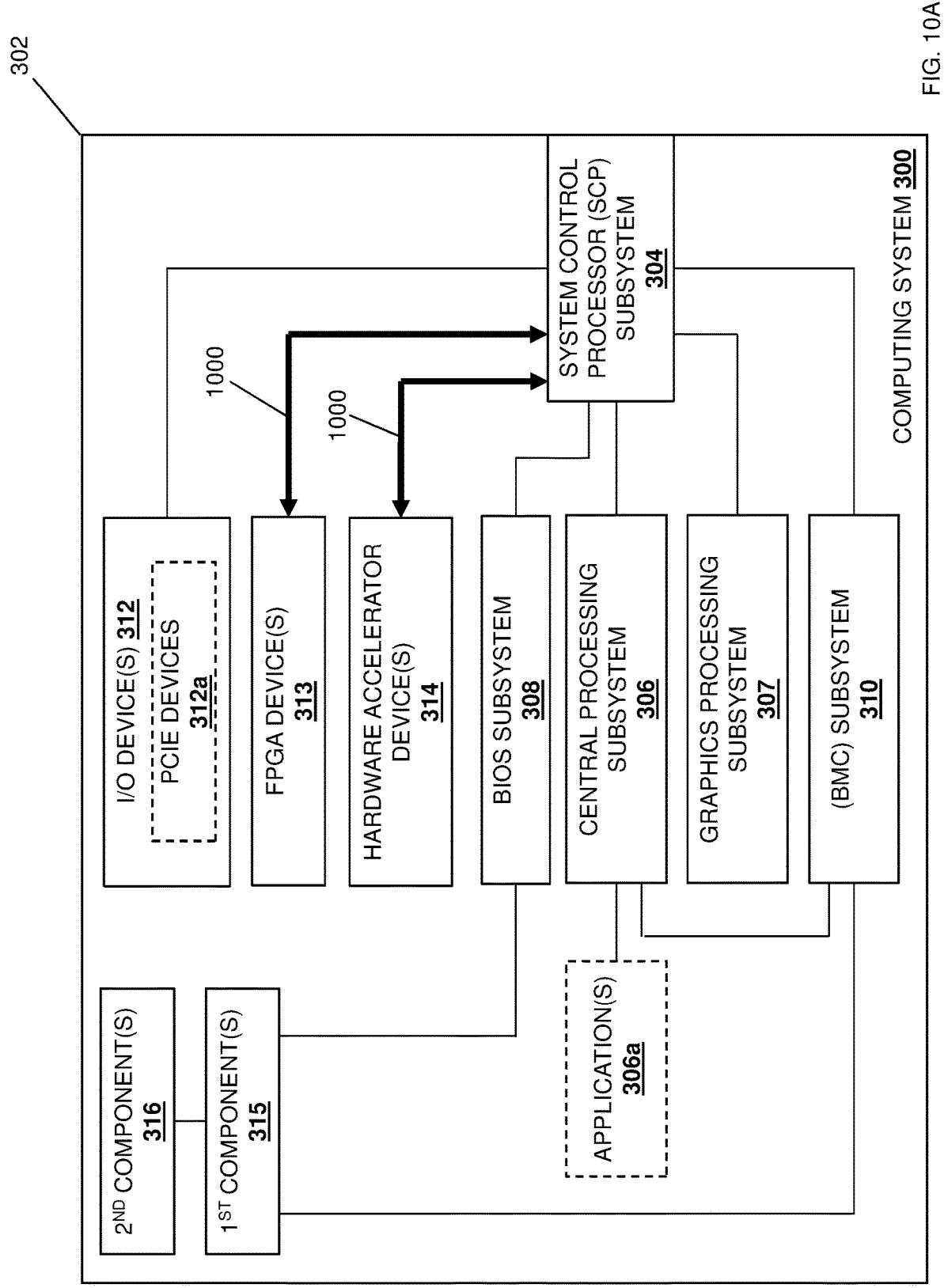
FIG. 10A is a schematic view illustrating an embodiment of the computing system of FIG. 3A operating during the method of FIG. 5.
Figure 10B:
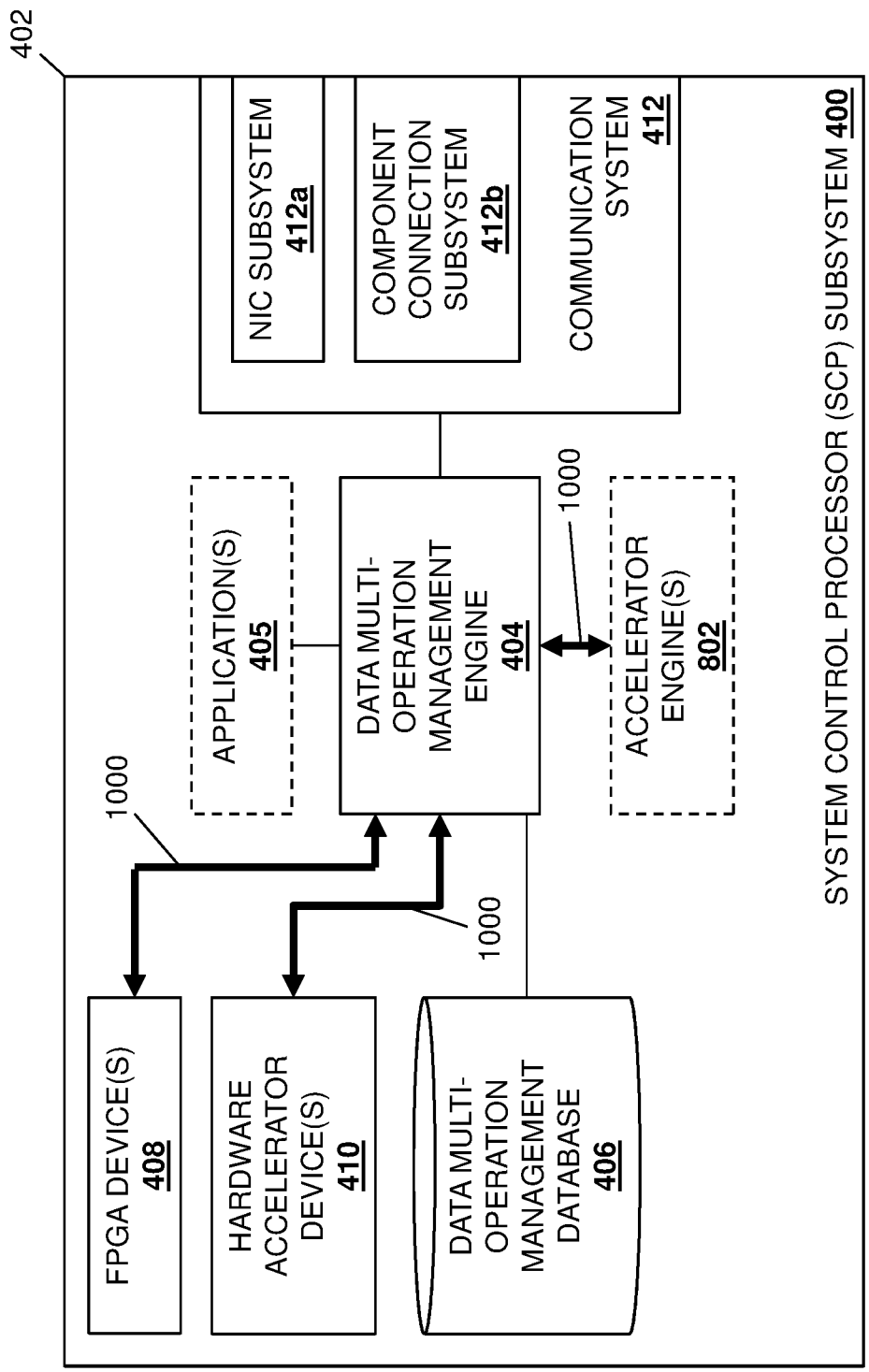
FIG. 10B is a schematic view illustrating an embodiment of the SCP subsystem of FIG. 4 operating during the method of FIG. 5.

With reference to FIGS. 10A and 10B and based on the assignment and configuration operations at blocks 506 and 508, at block 510, any of the FPGA device(s) 313 in the computing system 202a/300, the hardware accelerator device(s) 314 in the computing system 202a/300, the FPGA device(s) 408 in the SCP subsystem 304/400 in the computing system 202a/300, the hardware accelerator device(s) 314 in the SCP subsystem 304/400 in the computing system 202a/300, and/or the accelerator engine(s) 802 instantiated and/or otherwise provided by the SCP subsystem 304/400 in the computing system 202a/300, may perform data transformation operations 1000 that may include the compress operations 604a, 604b, and up to 604c to compress data in each of the chunks in order to produce compressed data chunks; the encrypt operations 606a, 606b, and up to 606c to encrypt the compressed data in each of the chunks in order to produce encrypted, compressed data chunks; the checksum operations 608a, 608b, and up to 608c to generate a checksum for the encrypted, compressed data in each of the chunks in order to generate respective checksums for each encrypted, compressed data chunk, and add each respective checksum to its corresponding encrypted, compressed data chunk; the combine operation 610 to combine the encrypted, compressed data chunks (and their corresponding checksums); the destination location data operation 612 that provides for the transmission of the combined encrypted, compressed data chunks (and their corresponding checksums) to a destination location; the XOR operation 614 on the encrypted, compressed data chunks (and their corresponding checksums) to generate an XOR result; and the result provisioning data operation 616 that provides for the transmission of the XOR result to a result location.

Figure 11A:
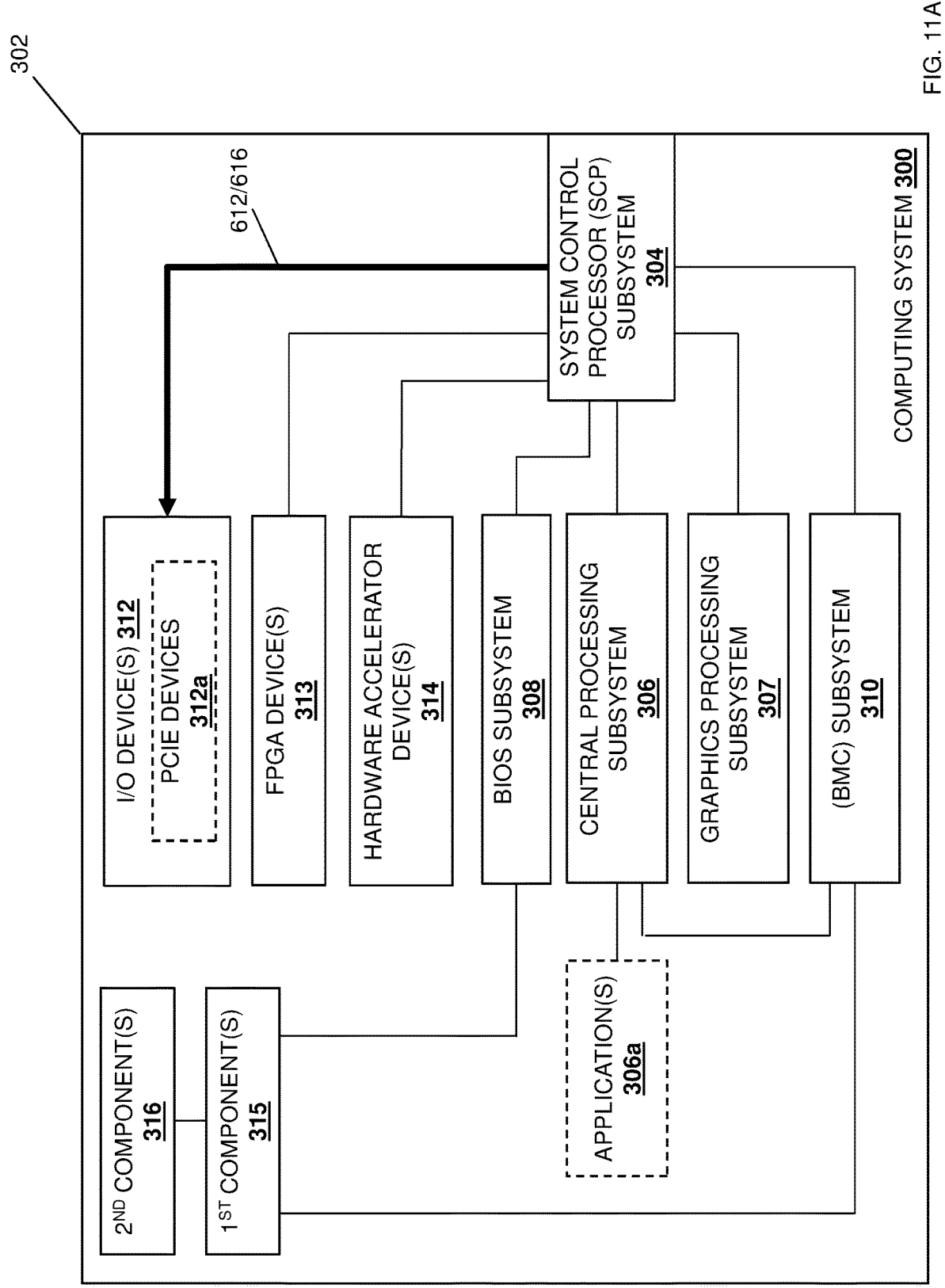
FIG. 11A is a schematic view illustrating an embodiment of the computing system of FIG. 3A operating during the method of FIG. 5.
Figure 11B:
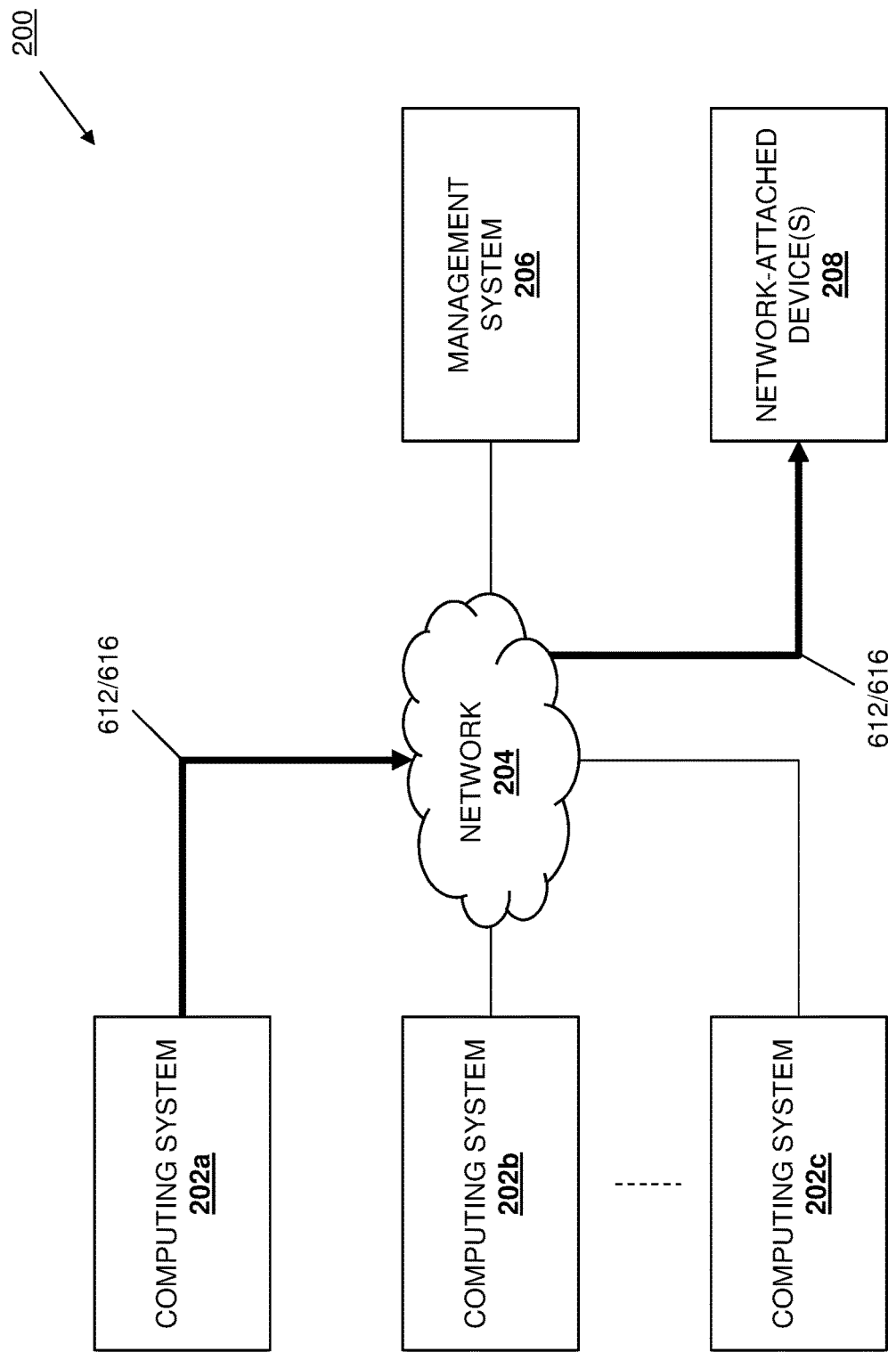
FIG. 11B is a schematic view illustrating an embodiment of the networked system of FIG. 2 operating during the method of FIG. 5.

As illustrated in FIG. 11A, the destination location data operation 612 performed by the accelerator subsystem(s) may operate to transmit the combined encrypted, compressed data chunks (and their corresponding checksums) to a destination location that may include the I/O device(s) 312 (e.g., an NVMe storage device provided by the PCIe devices 312a), while the result provisioning data operation 616 performed by the accelerator subsystem(s) may operate to transmit the XOR result to a result location that may include the I/O device(s) 312 (e.g., an NVMe storage device provided by the PCIe devices 312a) as well. As illustrated in FIG. 11B, the destination location data operation 612 performed by the accelerator subsystem(s) may operate to transmit the combined encrypted, compressed data chunks (and their corresponding checksums) to a destination location that may include the network-attached device(s) 208 (e.g., an NVMe storage device included in a network-attached storage system), while the result provisioning data operation 616 performed by the accelerator subsystem(s) may operate to transmit the XOR result to a result location that may include the network-attached device(s) 208 (e.g., an NVMe storage device included in a network-attached storage system) as well.

As such, in response to the single communication from the application 306a or 405 including the data multi-operation graph, each of the data operations in the data multi-operation graph will be assigned to one or more accelerator subsystems accessible to the SCP subsystem 304/400 in the computing system 202a/300, and those accelerator subsystems will be configured to perform those data operations in a sequence defined by the data multi-operation graph to transform data (e.g., first data located at a data source location to second data that is provided at a data destination location.)

The method 500 then proceeds to decision block 512 where it is determined whether an operation completion status has been identified. In an embodiment, at decision block 512, the data multi-operation management engine 404 in the SCP subsystem 304/400 in the computing system 202a/300 may monitor for the completion of the data operations performed by the accelerator subsystems at block 510. For example, any accelerator subsystem assigned a data operation in the data multi-operation graph and configured to perform that data operations with other accelerator subsystems performing other data operations in the data multi-operation graph may be configured to report the completion status of its data operation to the data multi-operation management engine 404 in the SCP subsystem 304/400 in the computing system 202a/300, or may have its performance of that data operation monitored by the data multi-operation management engine 404 in the SCP subsystem 304/400 in the computing system 202a/300. As such, at decision block 512, the data multi-operation management engine 404 in the SCP subsystem 304/400 in the computing system 202a/300 may determine a completion status for each of the data operations in the data multi-operation graph during, for example, a predetermined time period.

If at decision block 512, it is determined no operation completion status has been identified, the method 500 returns to block 510. As such, the method 500 may loop such that the accelerator subsystems continue to perform the data operations in the data multi-operation graph while the data multi-operation management engine 404 in the SCP subsystem 304/400 in the computing system 202a/300 continues to determine a completion status for each of the data operations in the data multi-operation graph until, for example, an expiration of the predetermined time period discussed above.

Figure 12A:
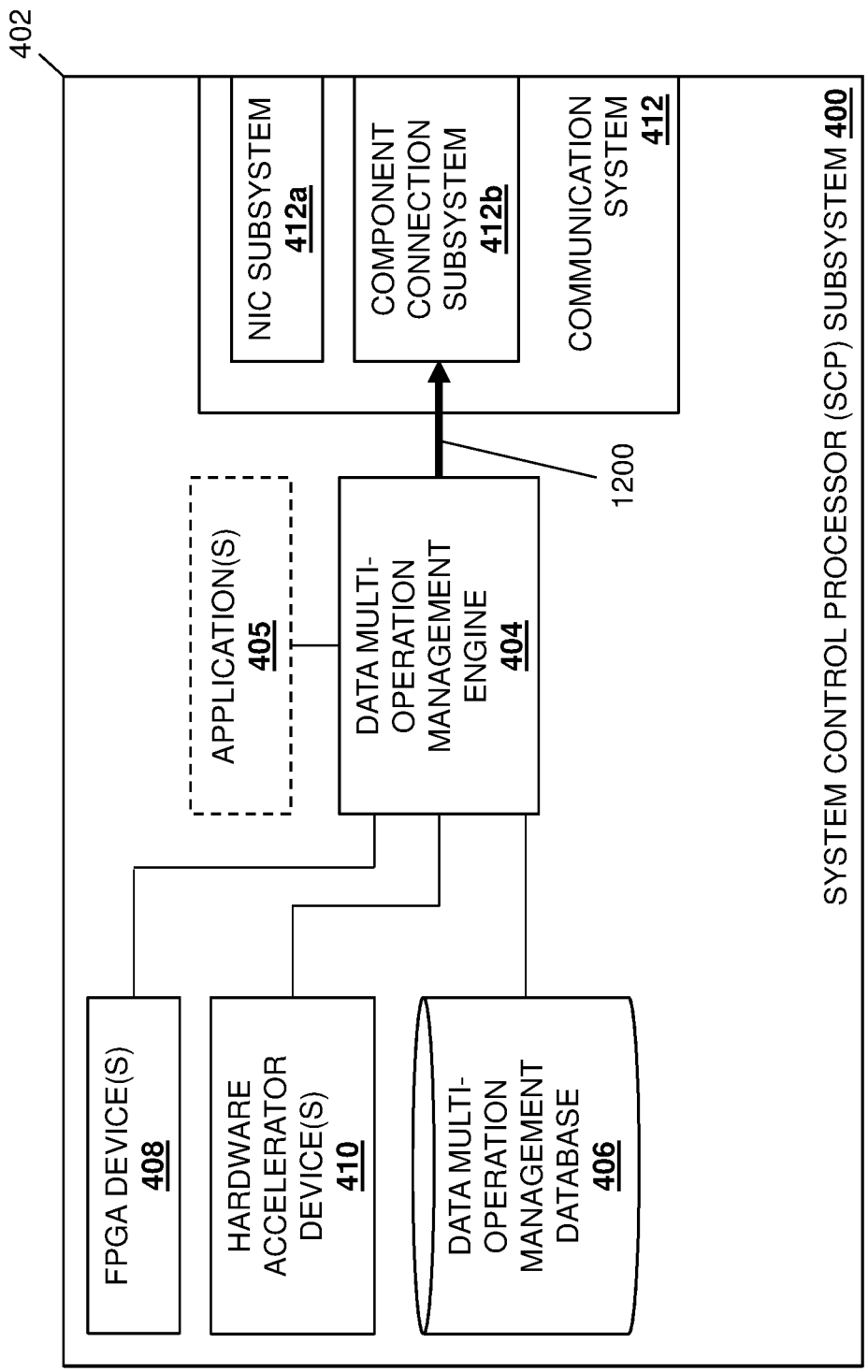
FIG. 12A is a schematic view illustrating an embodiment of the SCP subsystem of FIG. 4 operating during the method of FIG. 5.
Figure 12B:
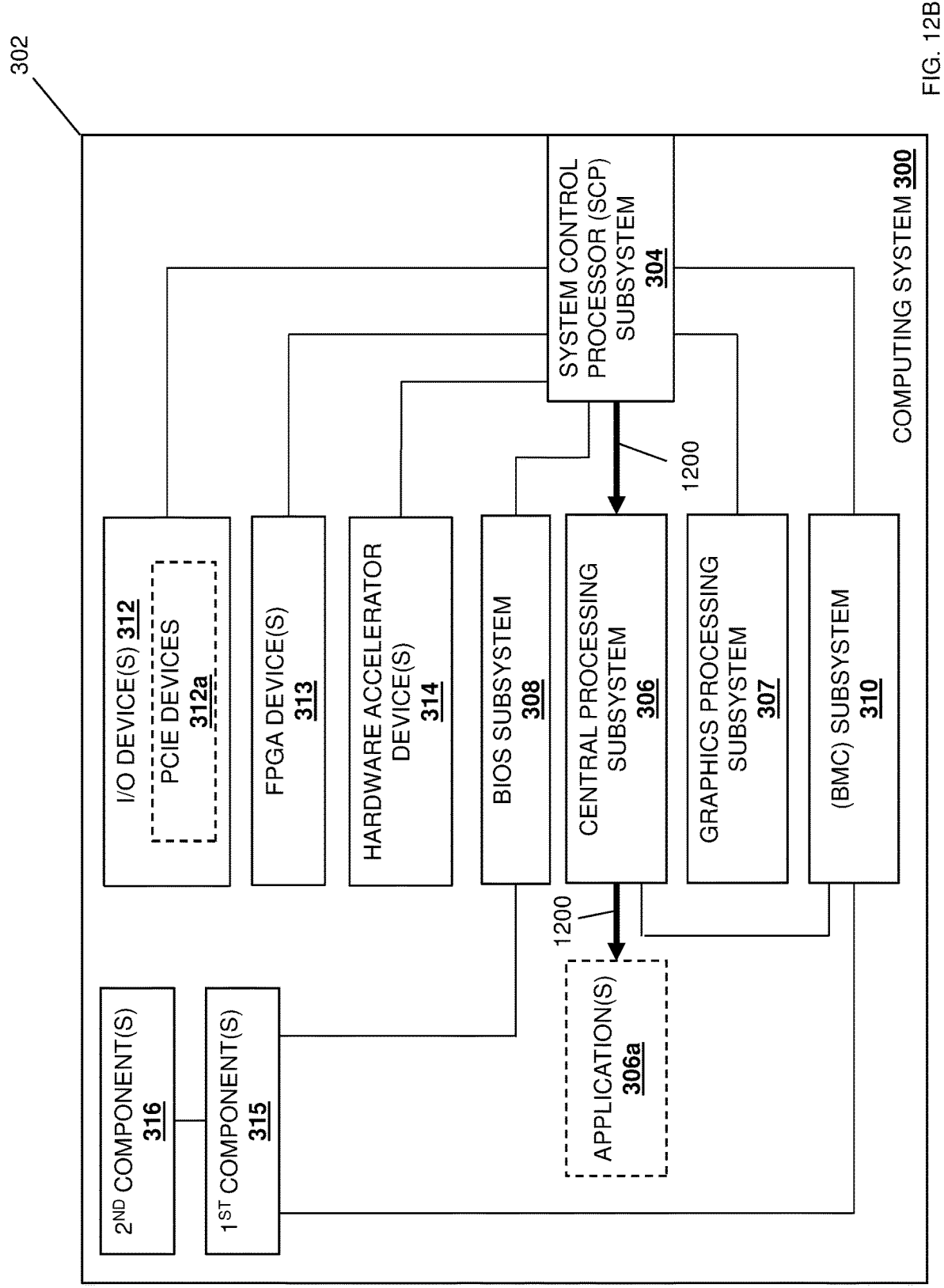
FIG. 12B is a schematic view illustrating an embodiment of the computing system of FIG. 3A operating during the method of FIG. 5.
Figure 12C:
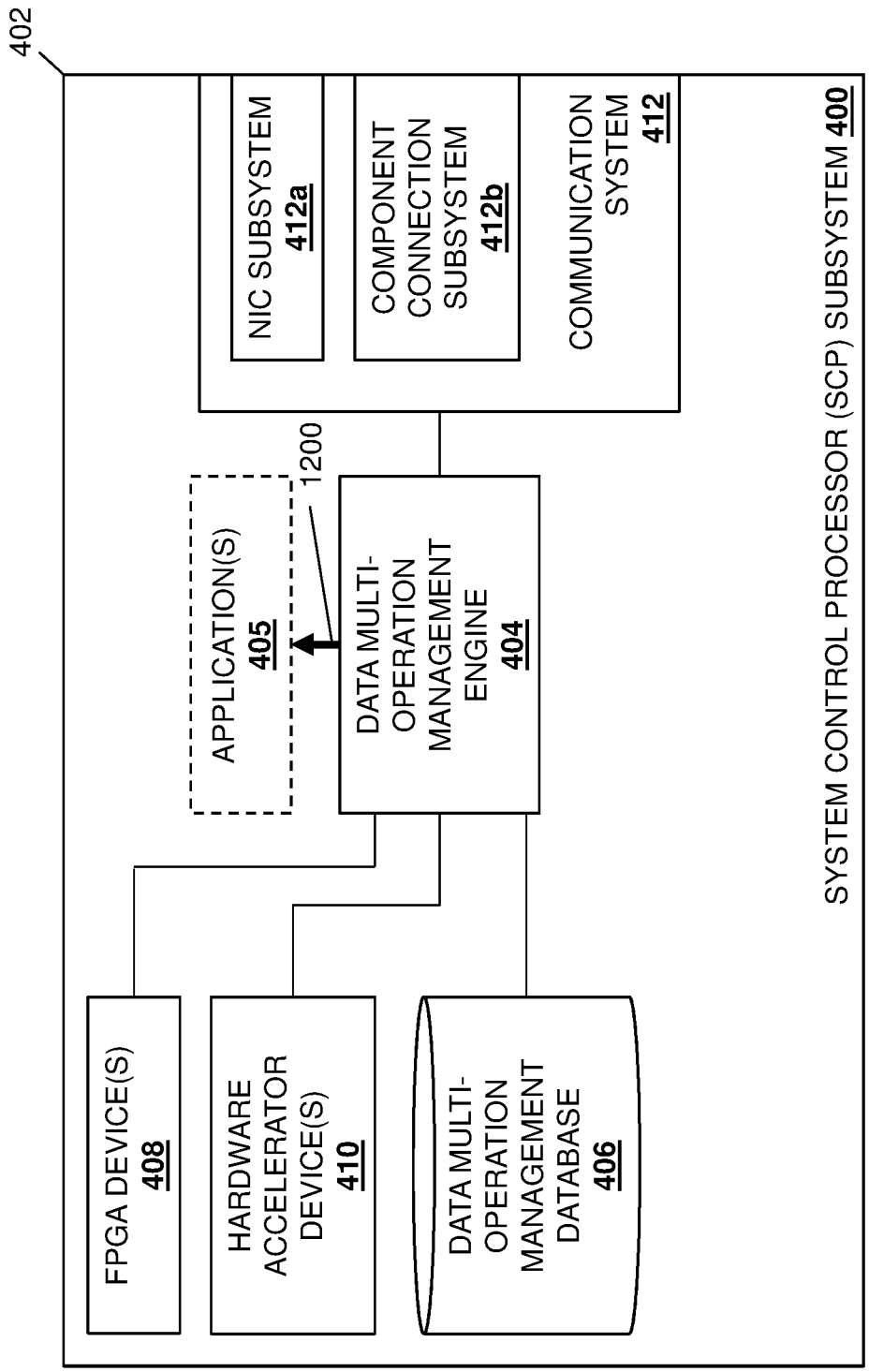
FIG. 12C is a schematic view illustrating an embodiment of the SCP subsystem of FIG. 4 operating during the method of FIG. 5.

If at decision block 512, it is determined an operation completion status has been identified, the method 500 proceeds to block 514 where the data multi-operation management subsystem transmits a completion status communication to the application. In an embodiment, at decision block 512, the data multi-operation management engine 404 in the SCP subsystem 304/400 in the computing system 202a/300 may determine a completion status for each of the data operations in the data multi-operation graph by, for example, determining that each of those data operations has been completed (e.g., a completed operation status), or determining that at least one of those data operation has not been completed (e.g., a non-completed operation status.) In an embodiment, at block 514 and in response to determining the operation completion status, the data multi-operation management engine 404 in the SCP subsystem 304/400 in the computing system 202a/300 may perform operation completion status transmission operations 1200 that include, for example, generating a completion status and transmitting that completion status via the component connection subsystem 412b in its communication system 412 and to the application 306a as illustrated in FIGS. 12A and 12B, or generating a completion status and transmitting that completion status to the application 405 as illustrated in FIG. 12C. As such, the data multi-operation management engine 404 in the SCP subsystem 304/400 in the computing system 202a/300 may transmit a single communication (e.g., an interrupt and competition status) to the application 306a or 405 to inform it of the successful or non-successful completion of the data operations included in the data multi-operation graph.

Thus, systems and methods have been described that provide for the abstraction of accelerator subsystems (e.g., dedicated hardware accelerator subsystems, programmable hardware accelerator subsystems, software accelerator subsystems instantiated using processing hardware, etc.) from the storage software stack/applications in a server device, along with the use of a data multi-operation graph to assign multiple data operations to different accelerator subsystems and chain together the data operations performed by those accelerator subsystems in a sequence required to transform data in a desired manner. For example, the graph-based data multi-operation system of the present disclosure may include an SCP subsystem coupled to an SDS application and accelerator subsystems. The SCP subsystem receives a data multi-operation graph from the SDS application that identifies first data and defines operations for performance on the first data to transform the first data into second data. The SCP subsystem assigns each of the operations to at least one of the accelerator systems, and configures the accelerator subsystems to perform the operations in a sequence that transforms the first data into the second data, When the SCP subsystem determines a completion status for the performance of the operations by the accelerator subsystems, it transmits a completion status communication to the SDS application that indicates the completion status of the performance of the plurality of operations by the plurality of accelerator subsystems. As such, a single request from the SDS application allows for the performance of complex data operations using multiple accelerator subsystems, followed by a single completion communication to that SDS application to indicate when those data operations are completed, thus decreasing costs and time associated with the implementation and use of accelerator subsystems.

As will be appreciated by one of skill in the art in possession of the present disclosure, the graph-based data multi-operation system of the present disclosure enables service chaining of multiple data-intensive operations rather than requiring the submission of respective operation requests one-at-a-time, graph-based execution of dedicated/programmable hardware/software accelerator subsystems to accomplish the execution of complex multi-function tasks, abstracted interfaces between SDS software and hardware to enable modular architecture and implementations (e.g., allowing accelerator subsystem vendors to compete on accelerator subsystem features and performance), data multi-operation graph generation per each I/O instruction, and/or other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A graph-based data multi-operation system, comprising:
   an application;
   a plurality of accelerator subsystems; and
   a data multi-operation management subsystem that is coupled to the application and the plurality of accel- erator subsystems, wherein the data multi-operation management subsystem is configured to:
receive, from the application, a data multi-operation graph that identifies first data and defines a plurality of operations for performance on the first data to transform the first data into second data;
assign each of the plurality of operations defined by the data multi-operation graph to at least one of the plurality of accelerator systems;
configure the plurality of accelerator subsystems to perform the plurality of operations defined by the data multi-operation graph in a sequence that transforms the first data into the second data;
determine a completion status for the performance of the plurality of operations by the plurality of accelerator subsystems to transform the first data into the second data; and
transmit, to the application, a completion status communication that indicates the completion status of the performance of the plurality of operations by the plurality of accelerator subsystems to transform the first data into the second data.

2. The system of claim 1, wherein the data multi-operation graph identifies:
a data source location for the first data;
a plurality of first data operations that are included in the plurality of operations for performance on the first data to transform the first data into the second data; and
a data destination location for the second data.

3. The system of claim 1, wherein the data multi-operation graph identifies:
a plurality of second data operations that are included in the plurality of operations for performance on the first data to transform the first data into third data; and
a data analytics location for the third data.

4. The system of claim 1, wherein the data multi-operation management subsystem is configured to:
identify at least one hardware accelerator subsystem that is included in the plurality of accelerator subsystems; and
assign at least one of the plurality of operations defined by the data multi-operation graph to the at least one hardware accelerator subsystem.

5. The system of claim 1, wherein the data multi-operation management subsystem is configured to:
configure at least one hardware accelerator subsystem that is included in the plurality of accelerator subsystems to provide at least one configured hardware accelerator subsystem; and
assign at least one of the plurality of operations defined by the data multi-operation graph to the at least one configured hardware accelerator subsystem.

6. The system of claim 1, wherein the data multi-operation management subsystem is configured to:
configure at least one software accelerator subsystem that is included in the plurality of accelerator subsystems to provide at least one configured software accelerator subsystem; and
assign at least one of the plurality of operations defined by the data multi-operation graph to the at least one configured software accelerator subsystem.

7. An Information Handling System (IHS), comprising:
a processing subsystem; and
a memory subsystem that is coupled to the processing subsystem and that includes instructions that, when executed by the processing subsystem, cause the processing subsystem to provide a data multi-operation management engine that is configured to:
receive, from an application, a data multi-operation graph that identifies first data and defines a plurality of operations for performance on the first data to transform the first data into second data;
assign each of the plurality of operations defined by the data multi-operation graph to at least one of a plurality of accelerator systems coupled to the processing system;
configure the plurality of accelerator subsystems to perform the plurality of operations defined by the data multi-operation graph in a sequence that transforms the first data into the second data;
determine a completion status for the performance of the plurality of operations by the plurality of accelerator subsystems to transform the first data into the second data; and
transmit, to the application, a completion status communication that indicates the completion status of the performance of the plurality of operations by the plurality of accelerator subsystems to transform the first data into the second data.

8. The IHS of claim 7, wherein the data multi-operation graph identifies:
a data source location for the first data;
a plurality of first data operations that are included in the plurality of operations for performance on the first data to transform the first data into the second data; and
a data destination location for the second data.

9. The IHS of claim 8, wherein the data multi-operation graph identifies:
a plurality of second data operations that are included in the plurality of operations for performance on the first data to transform the first data into third data; and
a data analytics location for the third data.

10. The IHS of claim 7, wherein the data multi-operation management engine is configured to:
identify at least one hardware accelerator subsystem that is included in the plurality of accelerator subsystems; and
assign at least one of the plurality of operations defined by the data multi-operation graph to the at least one hardware accelerator subsystem.

11. The IHS of claim 7, wherein the data multi-operation management engine is configured to:
configure at least one hardware accelerator subsystem that is included in the plurality of accelerator subsystems to provide at least one configured hardware accelerator subsystem; and
assign at least one of the plurality of operations defined by the data multi-operation graph to the at least one configured hardware accelerator subsystem.

12. The IHS of claim 7, wherein the data multi-operation management engine is configured to:
configure at least one software accelerator subsystem that is included in the plurality of accelerator subsystems to provide at least one configured software accelerator subsystem; and
assign at least one of the plurality of operations defined by the data multi-operation graph to the at least one configured software accelerator subsystem.

13. The IHS of claim 7, wherein the data multi-operation management engine is configured to:

configure at least two of the plurality of accelerator subsystems to perform a subset of the plurality of operations defined by the data multi-operation graph in parallel.

14. A method for providing graph-based data multi-operations, comprising:
receiving, by a data multi-operation management subsystem from an application, a data multi-operation graph that identifies first data and defines a plurality of operations for performance on the first data to transform the first data into second data;
assigning, by the data multi-operation management subsystem, each of the plurality of operations defined by the data multi-operation graph to at least one of a plurality of accelerator systems coupled to the processing system;
configuring, by the data multi-operation management subsystem, the plurality of accelerator subsystems to perform the plurality of operations defined by the data multi-operation graph in a sequence that transforms the first data into the second data;
determining, by the data multi-operation management subsystem, a completion status for the performance of the plurality of operations by the plurality of accelerator subsystems to transform the first data into the second data; and
transmitting, by the data multi-operation management subsystem to the application, a completion status communication that indicates the completion status of the performance of the plurality of operations by the plurality of accelerator subsystems to transform the first data into the second data.

15. The method of claim 14, wherein the data multi-operation graph identifies:
a data source location for the first data;
a plurality of first data operations that are included in the plurality of operations for performance on the first data to transform the first data into the second data; and
a data destination location for the second data.

16. The method of claim 15, wherein the data multi-operation graph identifies:
a plurality of second data operations that are included in the plurality of operations for performance on the first data to transform the first data into third data; and
a data analytics location for the third data.

17. The method of claim 14, further comprising:
identifying, by the data multi-operation management subsystem, at least one hardware accelerator subsystem that is included in the plurality of accelerator subsystems; and
assigning, by the data multi-operation management subsystem, at least one of the plurality of operations defined by the data multi-operation graph to the at least one hardware accelerator subsystem.

18. The method of claim 14, further comprising:
configuring, by the data multi-operation management subsystem, at least one hardware accelerator subsystem that is included in the plurality of accelerator subsystems to provide at least one configured hardware accelerator subsystem; and
assigning, by the data multi-operation management subsystem, at least one of the plurality of operations defined by the data multi-operation graph to the at least one configured hardware accelerator subsystem.

19. The method of claim 14, further comprising:
configuring, by the data multi-operation management subsystem, at least one software accelerator subsystem that is included in the plurality of accelerator subsystems to provide at least one configured software accelerator subsystem; and
assigning, by the data multi-operation management subsystem, at least one of the plurality of operations defined by the data multi-operation graph to the at least one configured software accelerator subsystem.

20. The method of claim 14, further comprising:
configuring, by the data multi-operation management subsystem, at least two of the plurality of accelerator subsystems to perform a subset of the plurality of operations defined by the data multi-operation graph in parallel.

* * * * *